(12) United States Patent
Sturhan et al.

(10) Patent No.: US 10,988,054 B1
(45) Date of Patent: Apr. 27, 2021

(54) VEHICLE SWIVEL SEAT

(71) Applicants: Wilhelm Sturhan, Battle Creek, MI (US); Dan Karalash, Battle Creek, MI (US)

(72) Inventors: Wilhelm Sturhan, Battle Creek, MI (US); Dan Karalash, Battle Creek, MI (US)

(73) Assignee: Seating Technologies, Inc., Battle Creek, MI (US)

( * ) Notice: Subject to any disclaimer, the term of this patent is extended or adjusted under 35 U.S.C. 154(b) by 109 days.

(21) Appl. No.: 16/421,815

(22) Filed: May 24, 2019

(51) Int. Cl.
*B60N 2/14* (2006.01)
*B60N 2/90* (2018.01)
*B60K 28/10* (2006.01)

(52) U.S. Cl.
CPC .............. *B60N 2/14* (2013.01); *B60N 2/146* (2013.01); *B60K 28/10* (2013.01); *B60N 2002/981* (2018.02)

(58) Field of Classification Search
None
See application file for complete search history.

(56) References Cited

U.S. PATENT DOCUMENTS

| 3,622,202 A * | 11/1971 | Brown ...................... A47C 1/02 297/344.1 |
| 3,973,799 A * | 8/1976 | Berg ..................... B60N 2/0292 297/341 |
| 4,436,270 A * | 3/1984 | Muraishi ................ B60N 2/146 248/416 |
| 4,792,188 A * | 12/1988 | Kawashima ........... B60N 2/146 297/344.26 |
| 4,802,706 A * | 2/1989 | Onimaru .............. B60N 2/0224 296/68 |
| 4,846,529 A | 7/1989 | Tulley |
| 5,318,339 A | 6/1994 | Cherniak |
| 5,474,353 A * | 12/1995 | Koester .................. B60N 2/062 296/65.07 |
| 5,544,939 A * | 8/1996 | Baret ..................... B60N 2/146 297/340 |
| 5,762,398 A | 6/1998 | Gonzalez et al. |
| 6,015,188 A * | 1/2000 | Yundt ...................... A47C 3/16 297/242 |
| 6,186,573 B1 | 2/2001 | Thurab |
| 6,241,314 B1 | 6/2001 | Pufall |
| 6,572,172 B1 * | 6/2003 | Ninomiya ............ B60N 2/0232 296/65.07 |
| 7,364,234 B2 | 4/2008 | Begin et al. |
| 8,182,016 B2 | 5/2012 | Kaip et al. |

(Continued)

*Primary Examiner* — David E Allred
(74) *Attorney, Agent, or Firm* — Salter & Michaelson

(57) ABSTRACT

A vehicle seat apparatus that includes a bottom assembly that is attached to a floor of the vehicle; a top assembly that is for the support of a seat structure; a turntable that is mounted between the bottom assembly and the top assembly and rotatable to allow rotational motion of the top assembly relative to the bottom assembly; and a lever mechanism secured to the top assembly and pivotal relative to the bottom assembly in order to pivot the top assembly and seat structure from a more forward position to a more sideways position so as to provide enhanced access to the seat structure. The vehicle seat apparatus is comprised of a base cushion and an upright member with only the base cushion being swivelled.

13 Claims, 25 Drawing Sheets

(56) References Cited

U.S. PATENT DOCUMENTS

| | | | |
|---|---|---|---|
| 9,242,581 B2 | 1/2016 | Farooq et al. | |
| 9,415,702 B2 | 8/2016 | Auger | |
| 9,428,276 B1 | 8/2016 | Marini et al. | |
| 9,707,865 B1* | 7/2017 | Buerkle | B60N 2/787 |
| 2001/0038223 A1* | 11/2001 | Suga | B60N 2/062 |
| | | | 296/65.11 |
| 2007/0284905 A1* | 12/2007 | Bailey | B60N 2/0232 |
| | | | 296/65.07 |
| 2011/0074198 A1* | 3/2011 | Iwasaki | B60N 2/062 |
| | | | 297/344.24 |
| 2013/0127221 A1* | 5/2013 | Seibold | B60N 2/06 |
| | | | 297/344.24 |
| 2014/0062155 A1* | 3/2014 | Honma | B60N 2/14 |
| | | | 297/338 |
| 2019/0016463 A1* | 1/2019 | Mallette | B64D 11/0696 |
| 2019/0126783 A1* | 5/2019 | Baccouche | B60N 2/0292 |
| 2020/0086768 A1* | 3/2020 | Line | B60N 2/0806 |

* cited by examiner

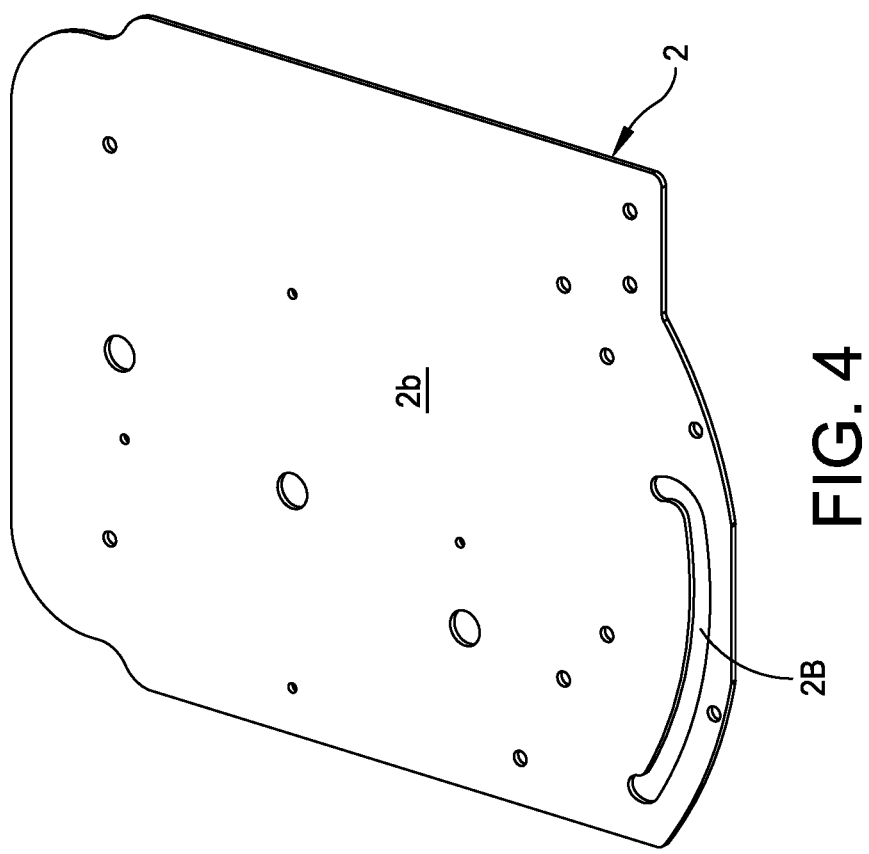
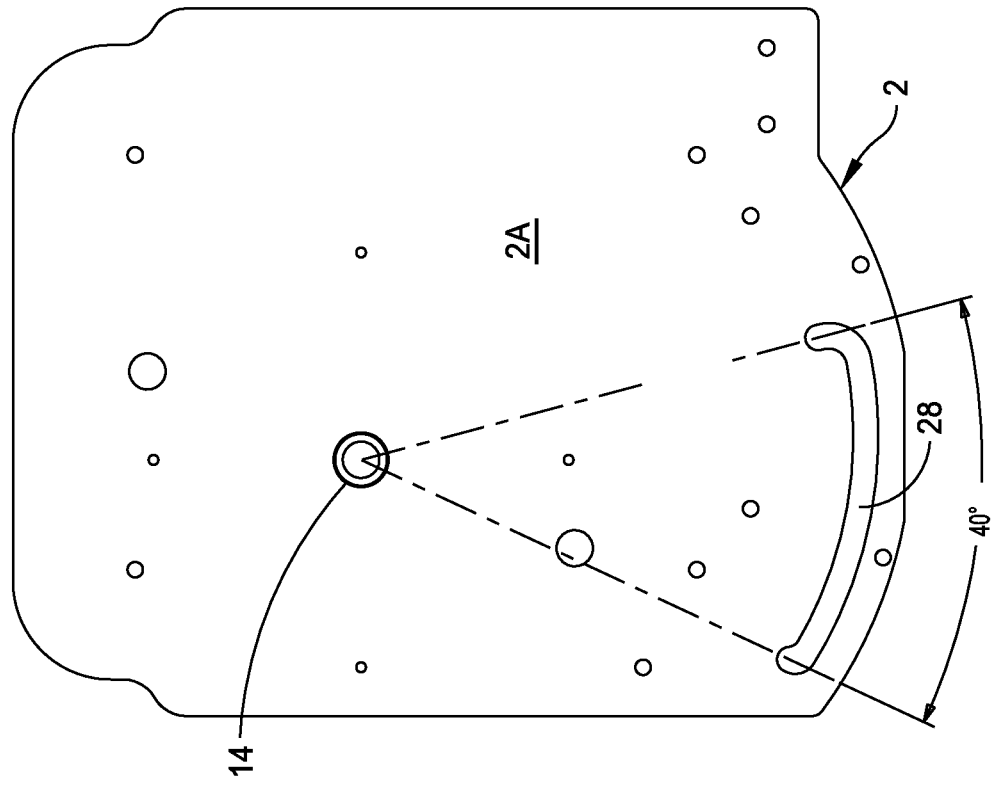

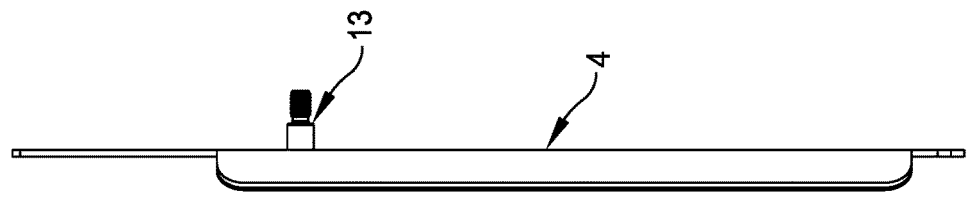
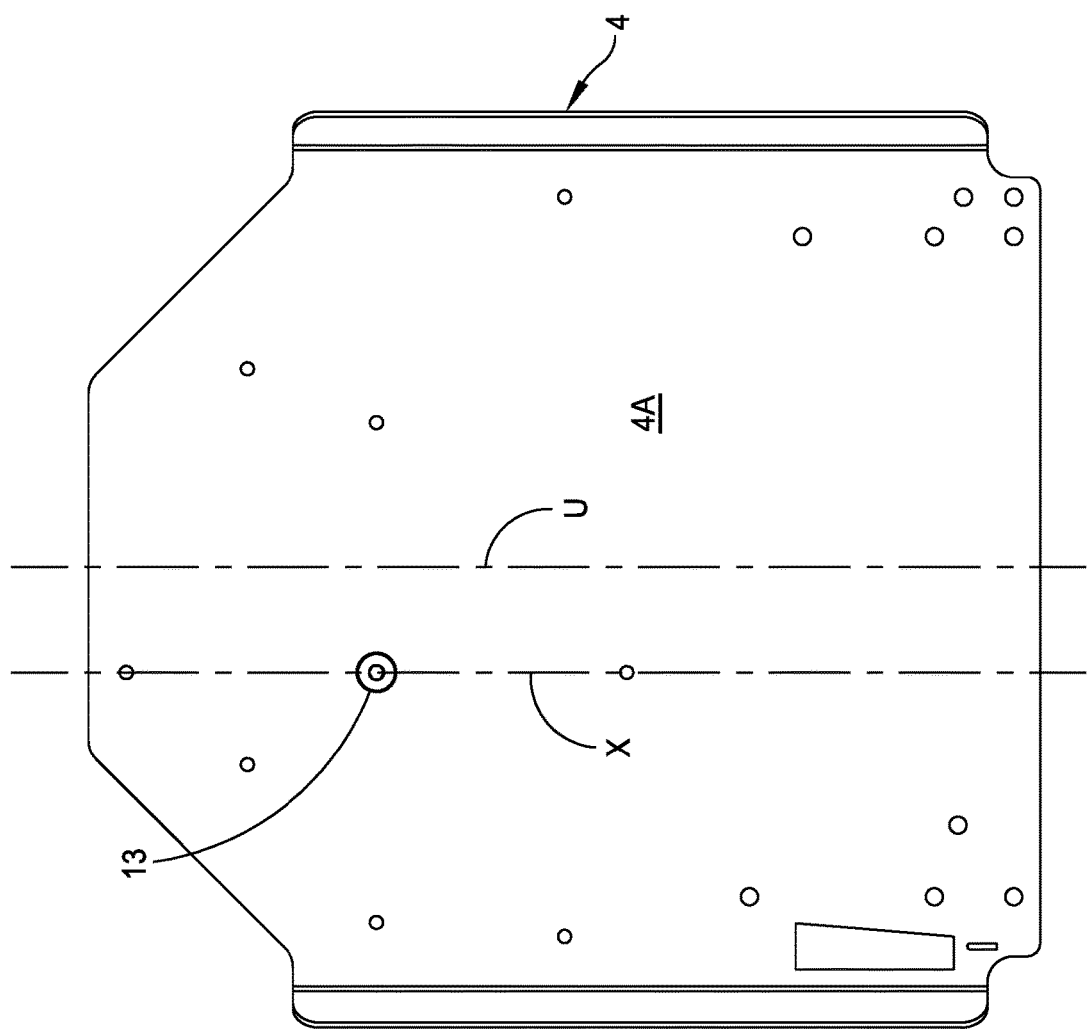

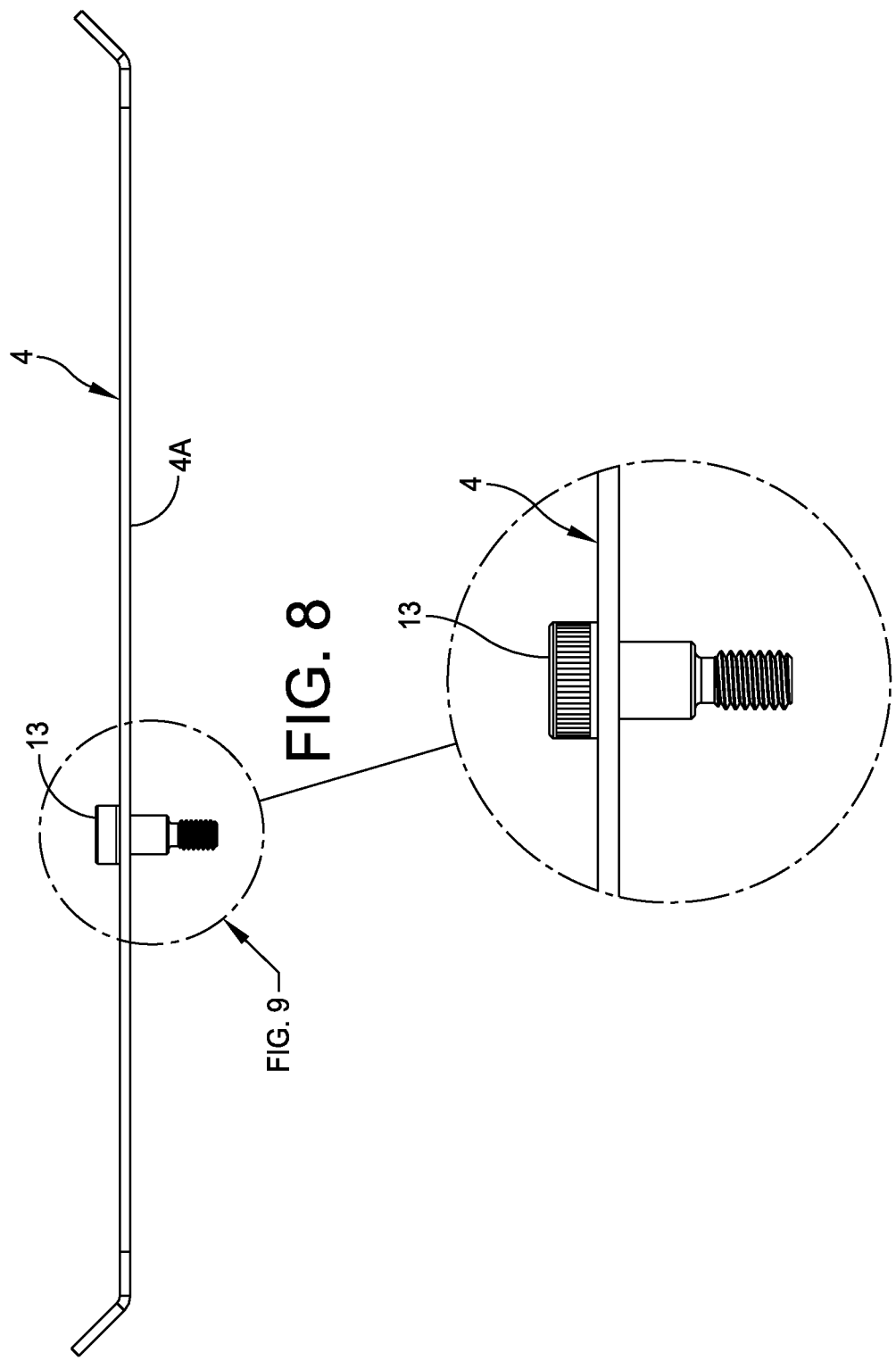

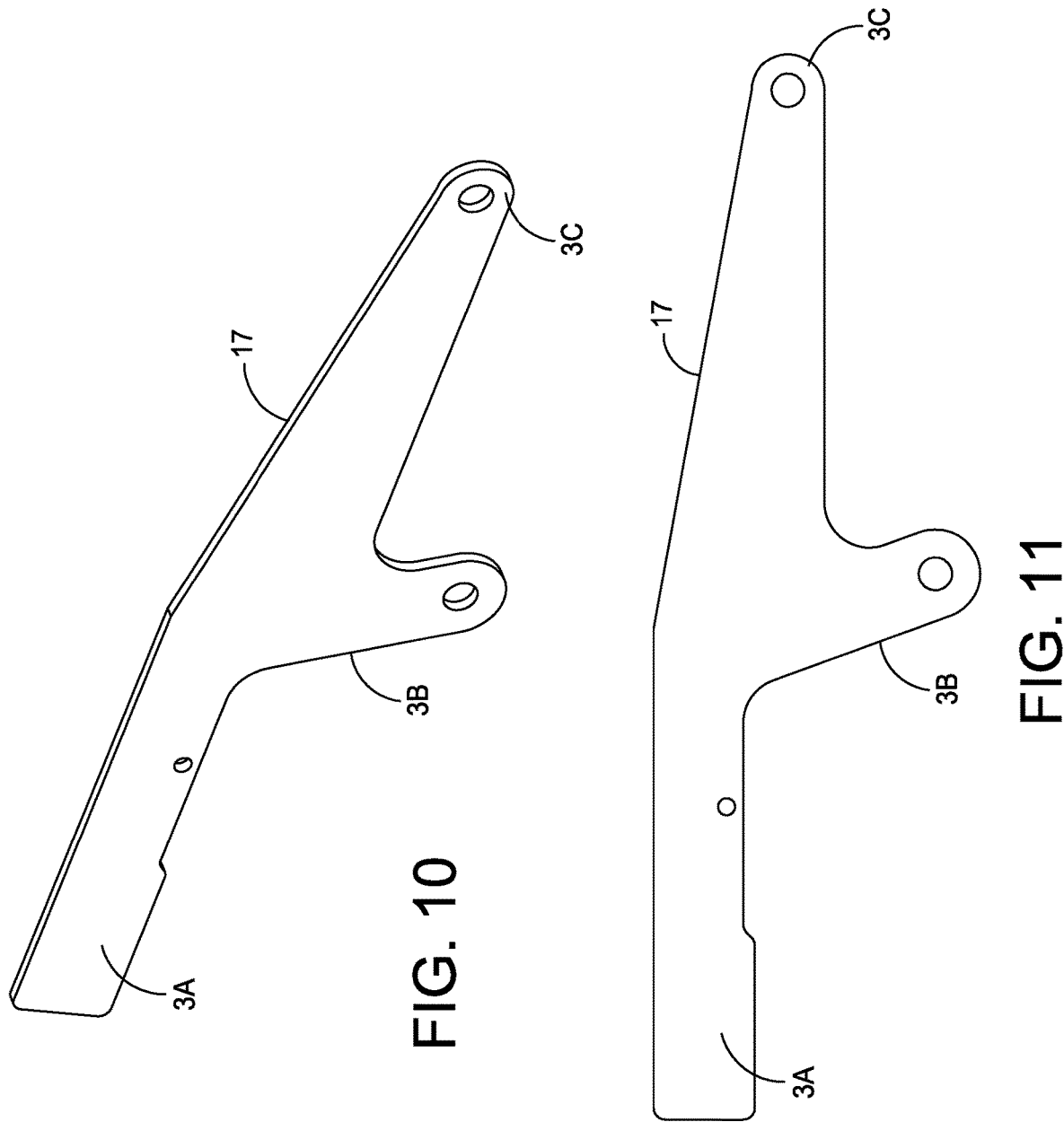

VEHICLE SWIVEL SEAT

FIELD OF THE INVENTION

The present invention relates in general to a swivel arrangement for the seat of a vehicle. More particularly, the present invention relates to a vehicle swivel seat construction that has multiple improvements and that is easy to operate. Even more particularly, the present invention pertains to a vehicle swivel seat construction that can be manufactured relatively inexpensively and that provides a means for enhanced access to the vehicle seat.

BACKGROUND OF THE INVENTION

There are various structures shown in the prior art pertaining to swivel arrangements for vehicle seats. For example, refer to U.S. Pat. No. 4,846,529 to Tulley or U.S. Pat. No. 9,242,581 to Farooq et al. In both of these seat structures virtually the entire seat mechanism is adapted to swivel.

Another type of a swivel arrangement is shown in U.S. Pat. No. 5,318,339 to Cherniak. However, this construction is of very simple type and does not provide for any substantial swivelling of the seat structure itself. The Cherniak '339 patent simply shows a pad that is disposed on top of the seat rather than a seat arrangement as in accordance with the present invention where only the seat base pivots.

Accordingly, it is an object of the present invention to provide an improved vehicle swivel seat construction wherein only the seat base swivels between a forward position and a sidewards position, while the seat back remains stationary and non-swiveling.

Another object of the present invention is to provide a vehicle swivel seat construction incorporating a lever arrangement that enables the seat to be held in either a forward position or a sideways position.

Still another object of the present invention is to provide a vehicle swivel seat that is relatively simple in construction, that is easy to operate and which can be manufactured relatively inexpensively.

SUMMARY OF THE INVENTION

In accordance with the present invention there is provided a vehicle seat apparatus comprising: a bottom assembly that is attached to a floor of the vehicle; a top assembly that is for the support of a seat structure; a turntable that is mounted between the bottom assembly and the top assembly and rotatable to allow rotational motion of the top assembly relative to the bottom assembly; and a lever mechanism secured to the top assembly and pivotal relative to the bottom assembly in order to pivot the top assembly and seat structure from a more forward position to a more sideways position so as to provide enhanced access to the seat structure. With the present invention the swivel action occurs wherein only the seat cushion swivels while the seat back remains fixed in position.

In accordance with other aspects of the present invention including a seat board that is secured between the top assembly and the vehicle seat structure; wherein the seat structure includes a seat base and an upright seat back; wherein the lever mechanism includes an outer handle that is moveable to pivot the lever mechanism, an intermediate section that is secured to the top assembly and an end section that engages with bottom assembly; wherein the end section of the lever mechanism includes a cam member that engages in a slot that is defined in a bottom plate of the bottom assembly; wherein the slot that is defined in a bottom plate of the bottom assembly is arcuate in shape and the cam member engages into the arcuate slot; wherein the turntable includes an inner turntable disc and an outer turntable disc, one of which is attached to the top assembly and the other of which is attached to the bottom assembly; wherein the turntable has an open middle portion and further including a pivot member disposed within the open middle portion of the turntable and that functions as a pivot axis of the top assembly relative to the bottom assembly; including a first set of fasteners for securing the inner turntable disc to the top assembly and a second set of fasteners for securing the outer turntable disc to the bottom assembly, and wherein the pivot member is disposed offset from a central location of the bottom assembly; wherein the pivot member includes a pivot bolt that is disposed at the top assembly and engages with a nut at the bottom assembly; wherein the turntable includes an inner turntable disc and an outer turntable disc, one of which is attached to the top assembly and the other of which is attached to the bottom assembly; wherein the turntable has an open middle portion and further including a pivot member disposed within the open middle portion of the turntable and that functions as a pivot axis of the top assembly relative to the bottom assembly; including a first set of fasteners for securing the inner turntable disc to the top assembly and a second set of fasteners for securing the outer turntable disc to the bottom assembly, and wherein the pivot member is disposed offset from a central location of the bottom assembly; and wherein the pivot member includes a pivot bolt that is disposed at the top assembly and engages with a nut at the bottom assembly.

In accordance with another embodiment of the present invention there is provided a vehicle seat system that enables a vehicle seat structure to rotate from a more forward position to a more sideways position so as to provide access by a user to the seat structure, said vehicle seat system being comprised of a bottom assembly that is attached to a floor of the vehicle; a top assembly that is for the support of the seat structure; a turntable that is mounted between the bottom assembly and the top assembly and rotatable to allow rotational motion of the top assembly relative to the bottom assembly; and a lever mechanism that is operable between the top assembly and the bottom assembly in order to pivot the top assembly and seat structure from the more forward position to the more sideways position.

In accordance with still other aspects of the present invention the lever mechanism includes an outer handle that is moveable to pivot the lever mechanism, an intermediate section that is secured to the top assembly and an end section that engages with bottom assembly, and wherein the end section of the lever mechanism includes a cam member that engages in a slot that is defined in a bottom plate of the bottom assembly; the turntable includes an inner turntable disc and an outer turntable disc, one of which is attached to the top assembly and the other of which is attached to the bottom assembly, and wherein the turntable has an open middle portion and further including a pivot member disposed within the open middle portion of the turntable and that functions as a pivot axis of the top assembly relative to the bottom assembly; including a first set of fasteners for securing the inner turntable disc to the top assembly and a second set of fasteners for securing the outer turntable disc to the bottom assembly, and wherein the pivot member is disposed offset from a central location of the bottom assembly, and wherein the pivot member includes a pivot bolt that is disposed at the top assembly and engages with a nut at the bottom assembly.

In still another embodiment of the present invention there is provided a vehicle seat system that enables a vehicle seat structure to rotate from a more forward position to a more sideways position so as to provide access by a user to the seat structure, said vehicle seat system being comprised of a bottom assembly that is attached to a floor of the vehicle; a top assembly that is for the support of the seat structure; a turntable that is mounted between the bottom assembly and the top assembly and rotatable to allow rotational motion of the top assembly relative to the bottom assembly; and a lever mechanism that is operable between the top assembly and the bottom assembly in order to pivot the top assembly and seat structure from the more forward position to the more sideways position, wherein the turntable includes an inner turntable disc and an outer turntable disc, one of which is attached to the top assembly and the other of which is attached to the bottom assembly, and wherein the turntable has an open middle portion and further including a pivot member disposed within the open middle portion of the turntable and that functions as a pivot axis of the top assembly relative to the bottom assembly, including a first set of fasteners for securing the inner turntable disc to the top assembly and a second set of fasteners for securing the outer turntable disc to the bottom assembly, and wherein the pivot member is disposed offset from a central location of the bottom assembly, and wherein the pivot member includes a pivot bolt that is disposed at the top assembly and engages with a nut at the bottom assembly.

In accordance with further aspects of the present invention the lever mechanism includes an outer handle that is moveable to pivot the lever mechanism, an intermediate section that is secured to the top assembly and an end section that engages with bottom assembly, and wherein the end section of the lever mechanism includes a cam member that engages in a slot that is defined in a bottom plate of the bottom assembly.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which:

FIG. 3 is a plan view of the bottom assembly;

FIG. 4 is a perspective view of the bottom assembly;

FIG. 6 is a plan view of the top assembly;

FIG. 7 is a side view of the top assembly;

FIG. 8 is a side elevation view of the top assembly;

FIG. 9 is an enlarged view of a portion of FIG. 8 at the pivot bolt;

FIG. 10 is a perspective view of the lever;

FIG. 11 is a plan view of the lever;

DETAILED DESCRIPTION

In the background section we discussed a certain prior art in which the complete seat swivels such as shown in the Tulley and Farooq et al. patents. However, in accordance with the present invention there is provided a seat swivel arrangement in which basically only the base cushion swivels. The swivel arrangement of the present invention allows for a person to egress or ingress a seat more easily by means of allowing basically only the seat cushion to swivel. Other supporting structures typically under a seat would stay in place. The swivel system of the present invention also allows for the cushion swivelling to be locked into the forward driving position. The cushion can then be swivelled to either the left or the right depending upon the location of the seat in the vehicle.

In accordance with the present invention it is noted that only the seat cushion swivels or rotates. In accordance with, for example, FIG. 1A the seat base A and the seat back C do not rotate and in fact, remain stationary. This allowed swivelling action is particularly advantageous in tight spaces wherein the seat cushion can be rotated to get in and out of the vehicle without the entire seat structure rotating. There is a disadvantageous in allowing the entire seat structure to rotate as that could interfere with other components in the vehicle cabin.

In this regard, repetitive exits from a vehicle can be difficult due to the forward lock position of the seat relative to the desired egress direction (inboard or outboard). When the entire seat structure is pivoted, this requires heavy reinforcement to meet safety requirements that adds costs and weight to the seat. Accordingly, in the present invention there is provided a system in which basically only the seat cushion pivots thus providing an economic tradeoff. Moreover, by providing an off-center pivot that is biased toward the pivot direction, this allows for an enhanced ease for entry and exit.

Figure 31:
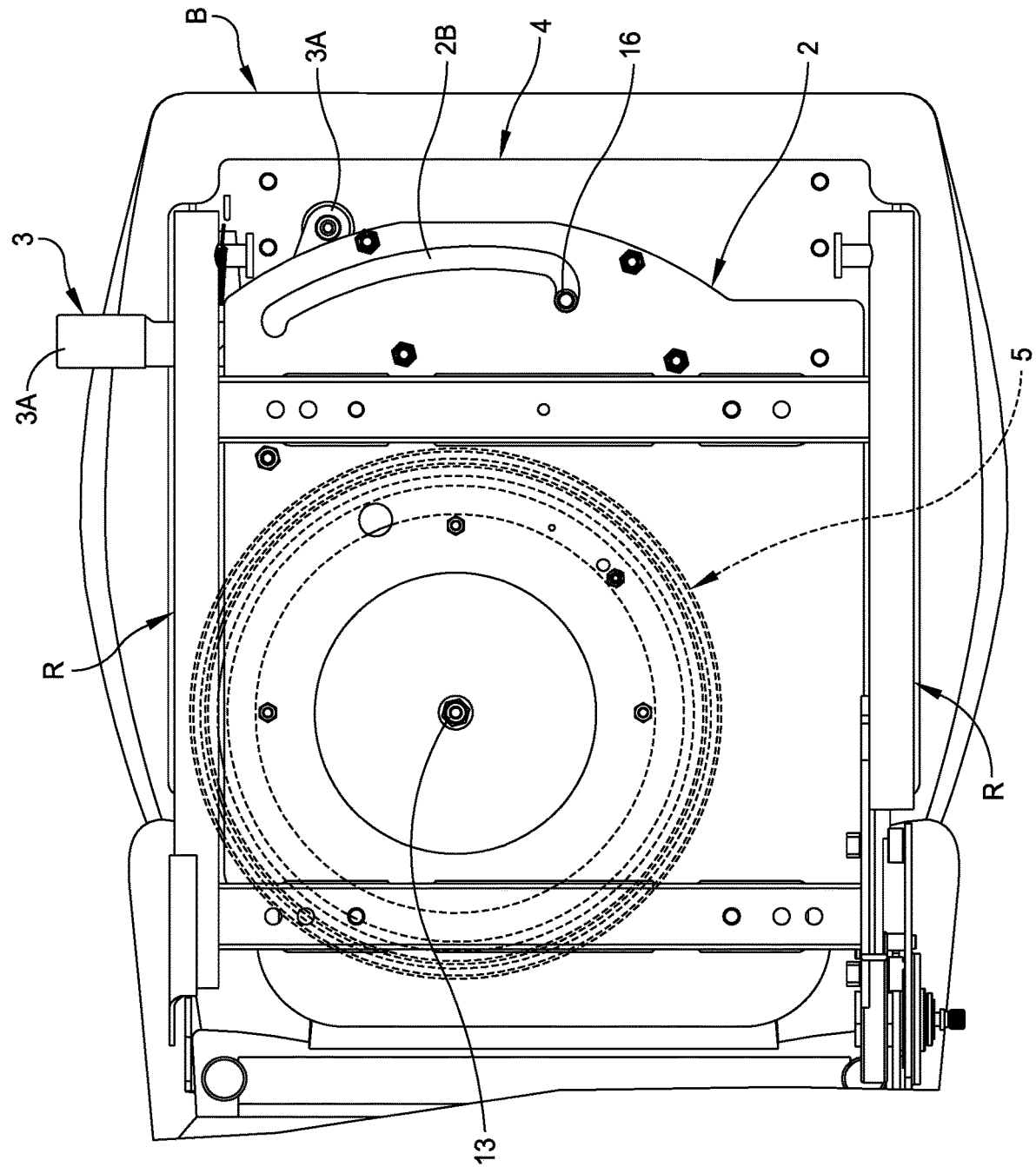
FIG. 31 is an underside view with the seat construction in a forward position.
Figure 33:
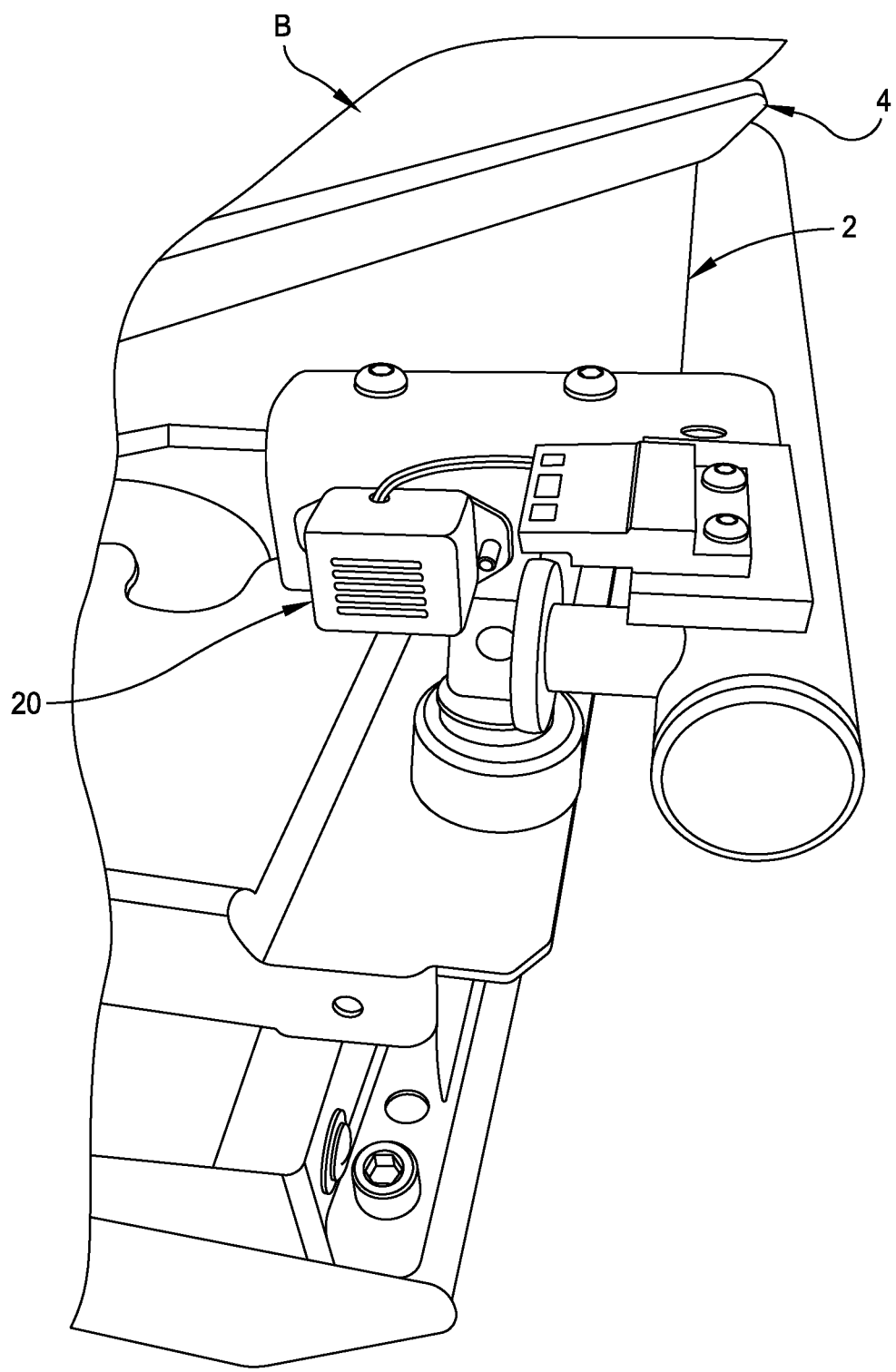
FIG. 33 illustrates a portion of the structure incorporating a buzzer.

Also in accordance with the present invention, such as illustrated in FIG. 33, there may be provided a buzzer 20. In addition to the seat cushion being able to be locked in the forward driving position, one may also provide this buzzer or sensor. This operates so that if the seat is not in the forward position, the sensor or buzzer is activated. Moreover, if the seat is not in the forward position, this is detected and possibly impedes the starting of the vehicle engine. The concept is to be able to operate the vehicle only when the seat is in the forward locked position which is the position illustrated in FIG. 31.

Figure 1:
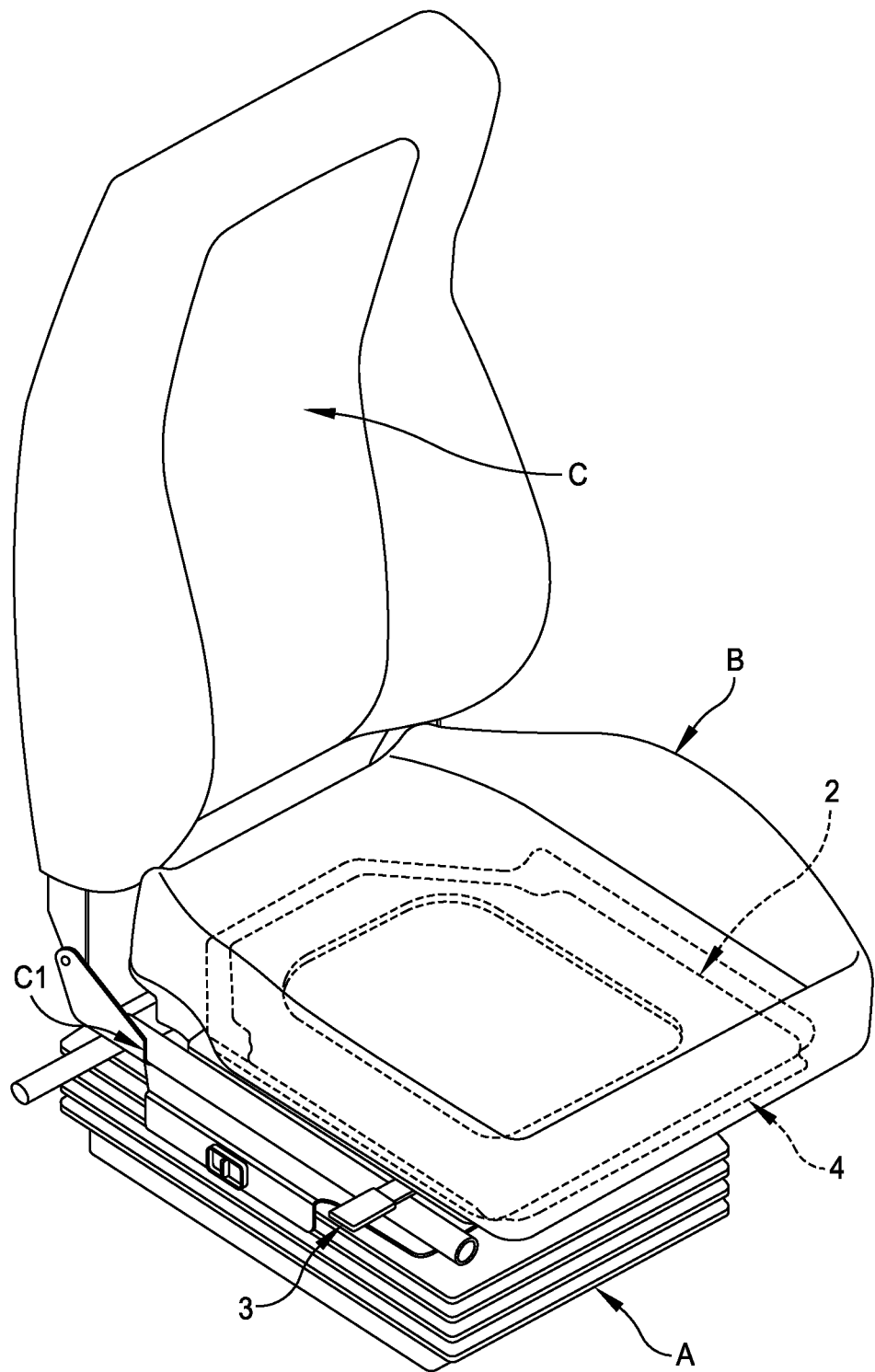
FIG. 1 is a perspective view showing the vehicle swivel seat construction of the present invention with the seat in a forward position.
Figure 2:
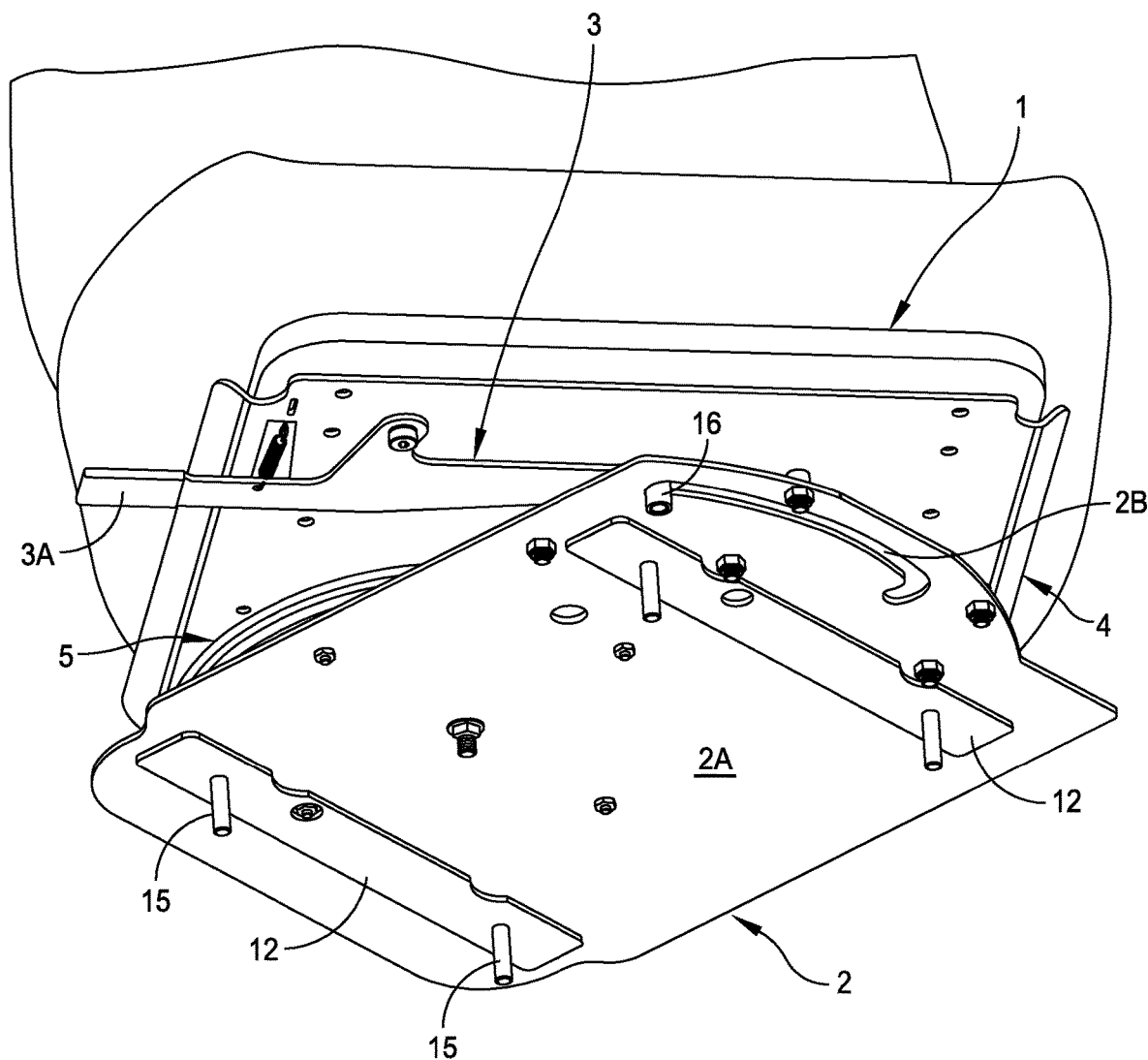
FIG. 2 is a perspective view from the underside and showing the seat construction pivoted outwardly.
Figure 5:
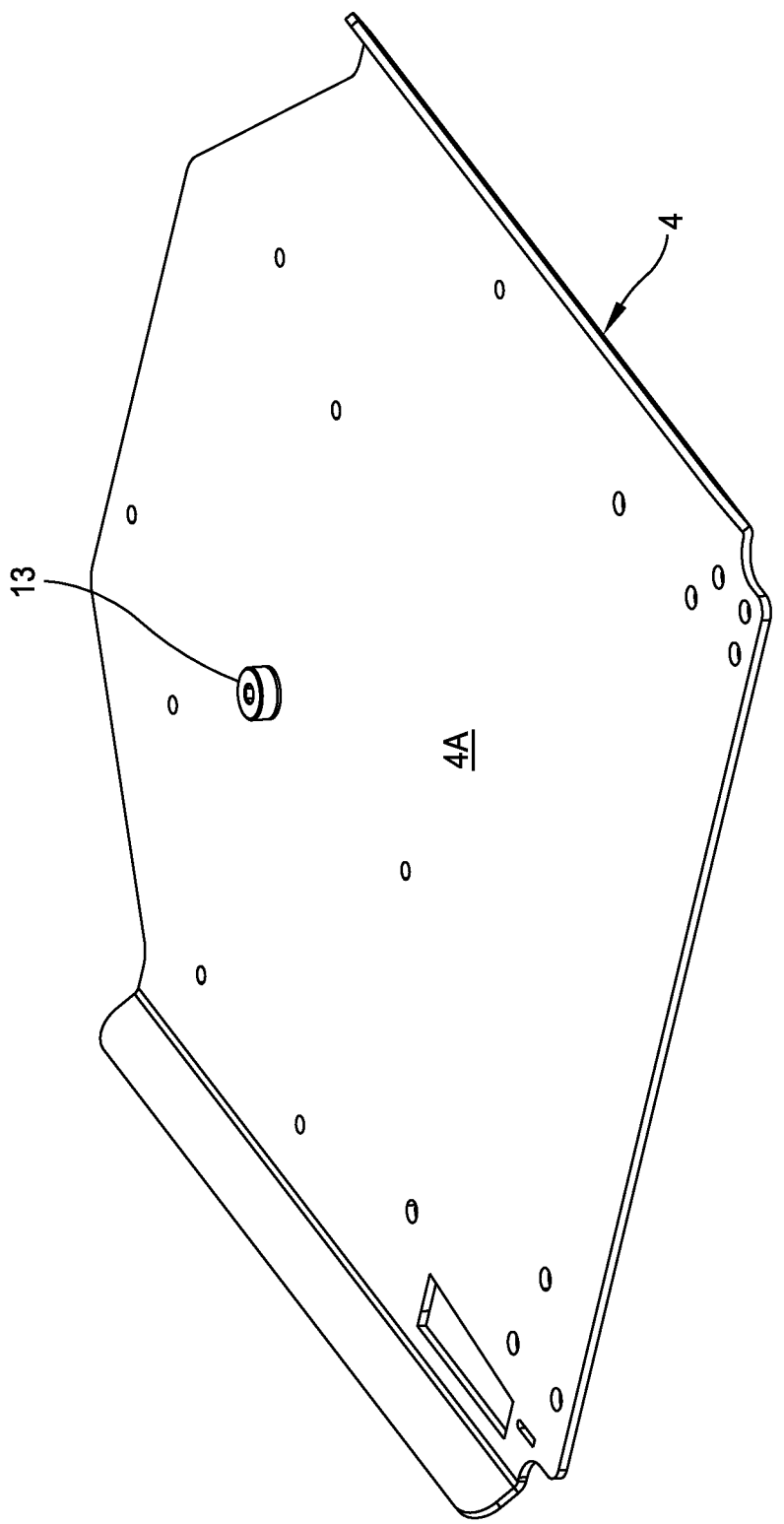
FIG. 5 is a perspective view of the top assembly.
Figure 12:
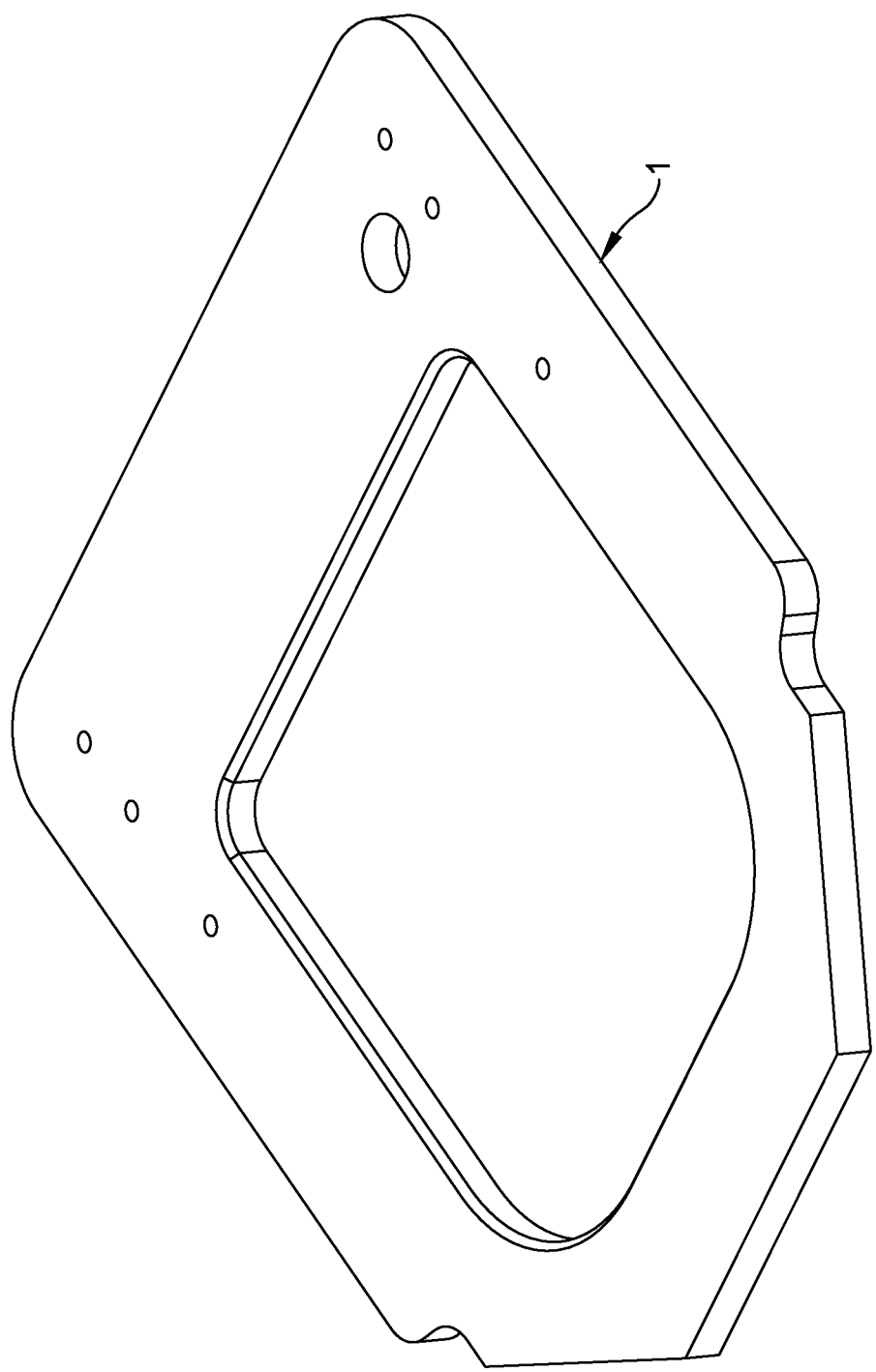
FIG. 12 is a perspective view of the seat board.
Figure 14:
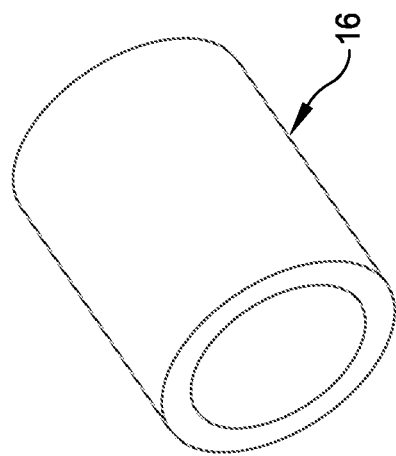
FIG. 14 is a perspective view of the plastic sleeve.
Figure 15:
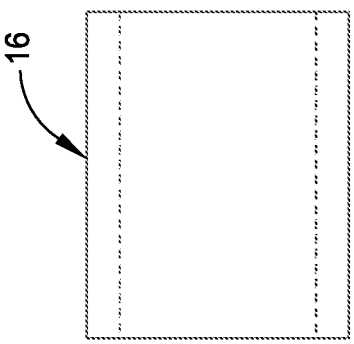
FIG. 15 is a side view of the plastic sleeve.
Figure 13:
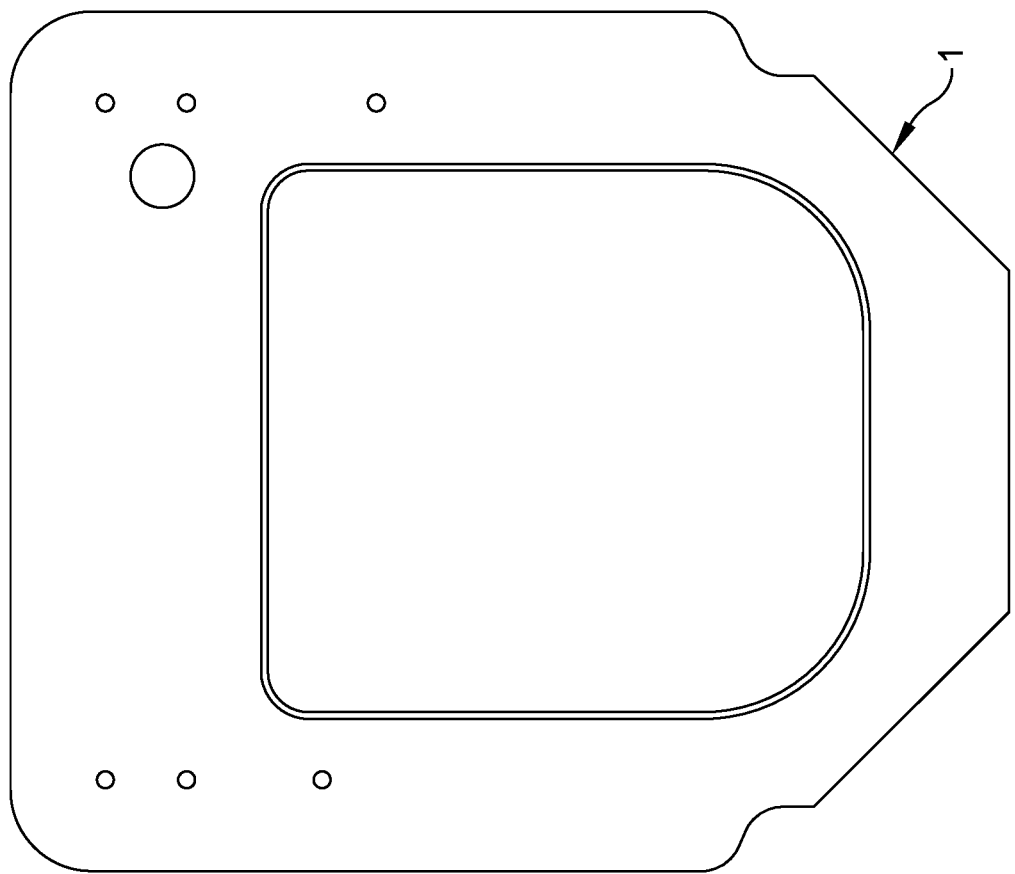
FIG. 13 is a plan view of the seat board.
Figure 16:
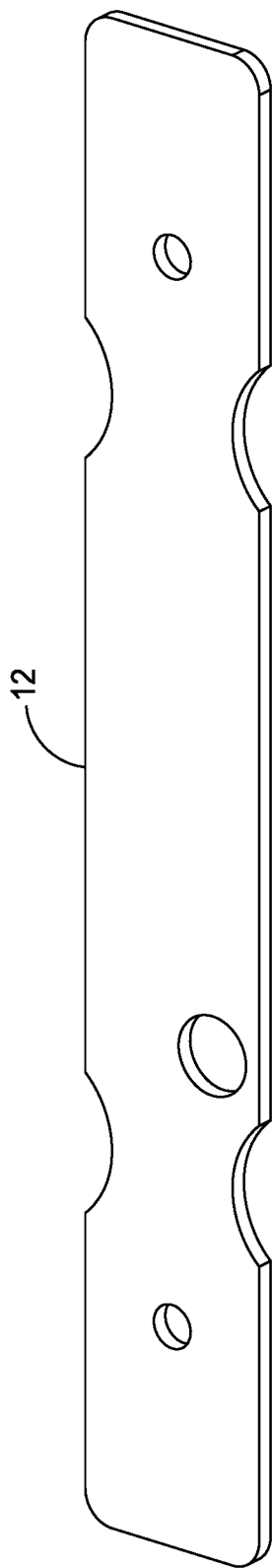
FIG. 16 is a perspective view of one of the spacers.
Figure 17:
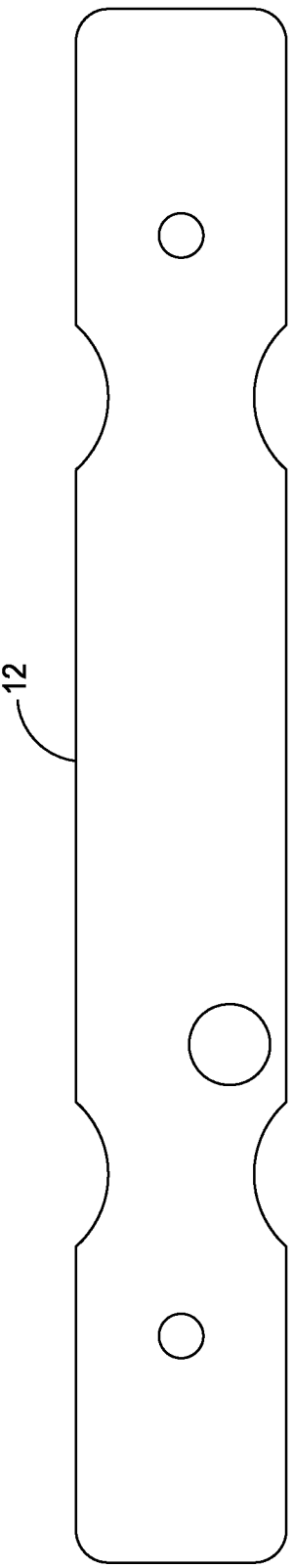
FIG. 17 is a plan view of the spacer of FIG. 16.
Figure 18:
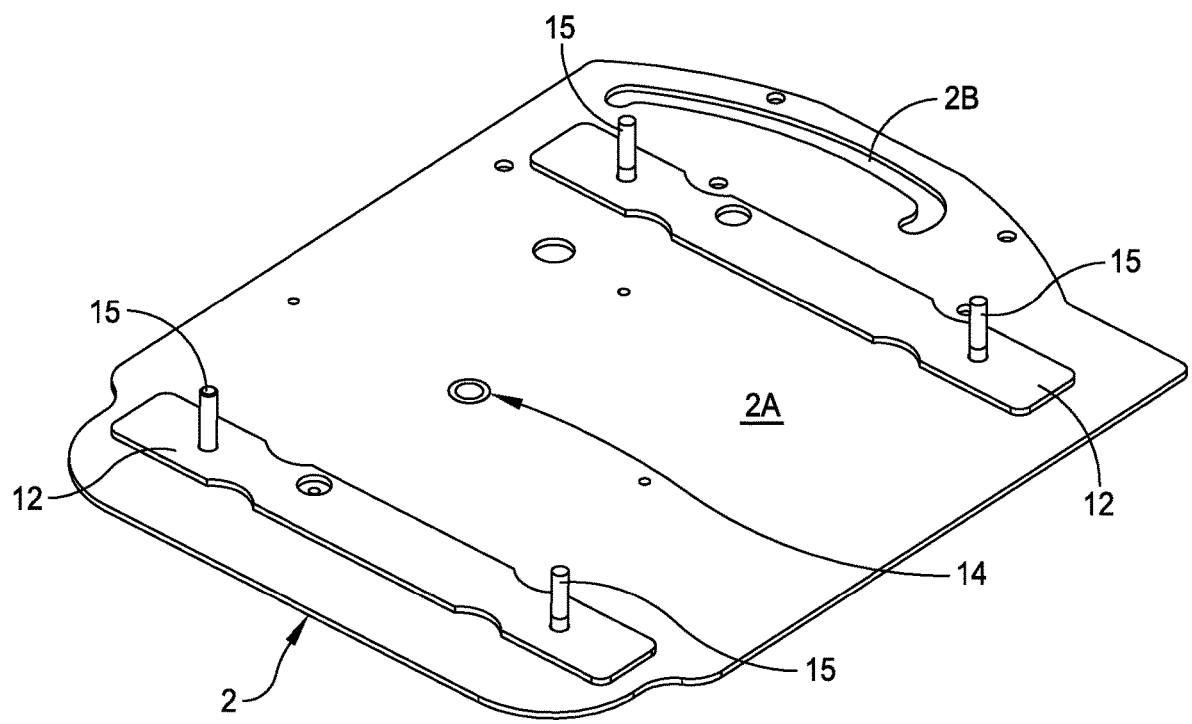
FIG. 18 is a perspective view illustrating the position of the spacers on the bottom assembly.
Figure 19:
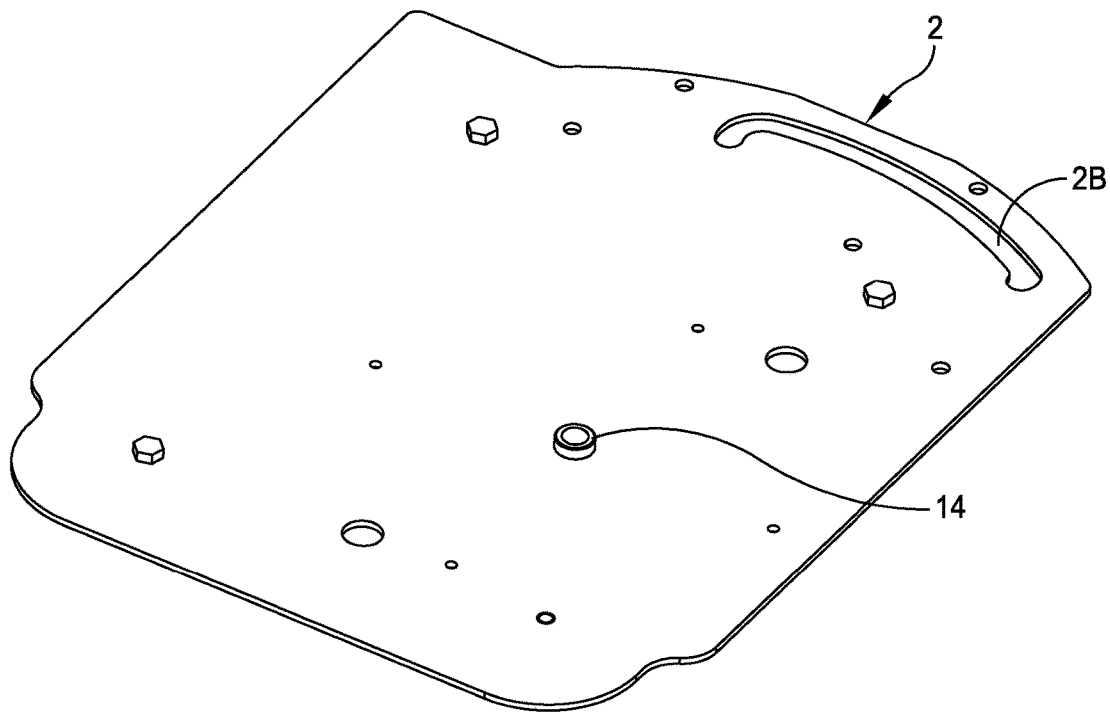
FIG. 19 is a perspective view of the bottom assembly.
Figure 20:
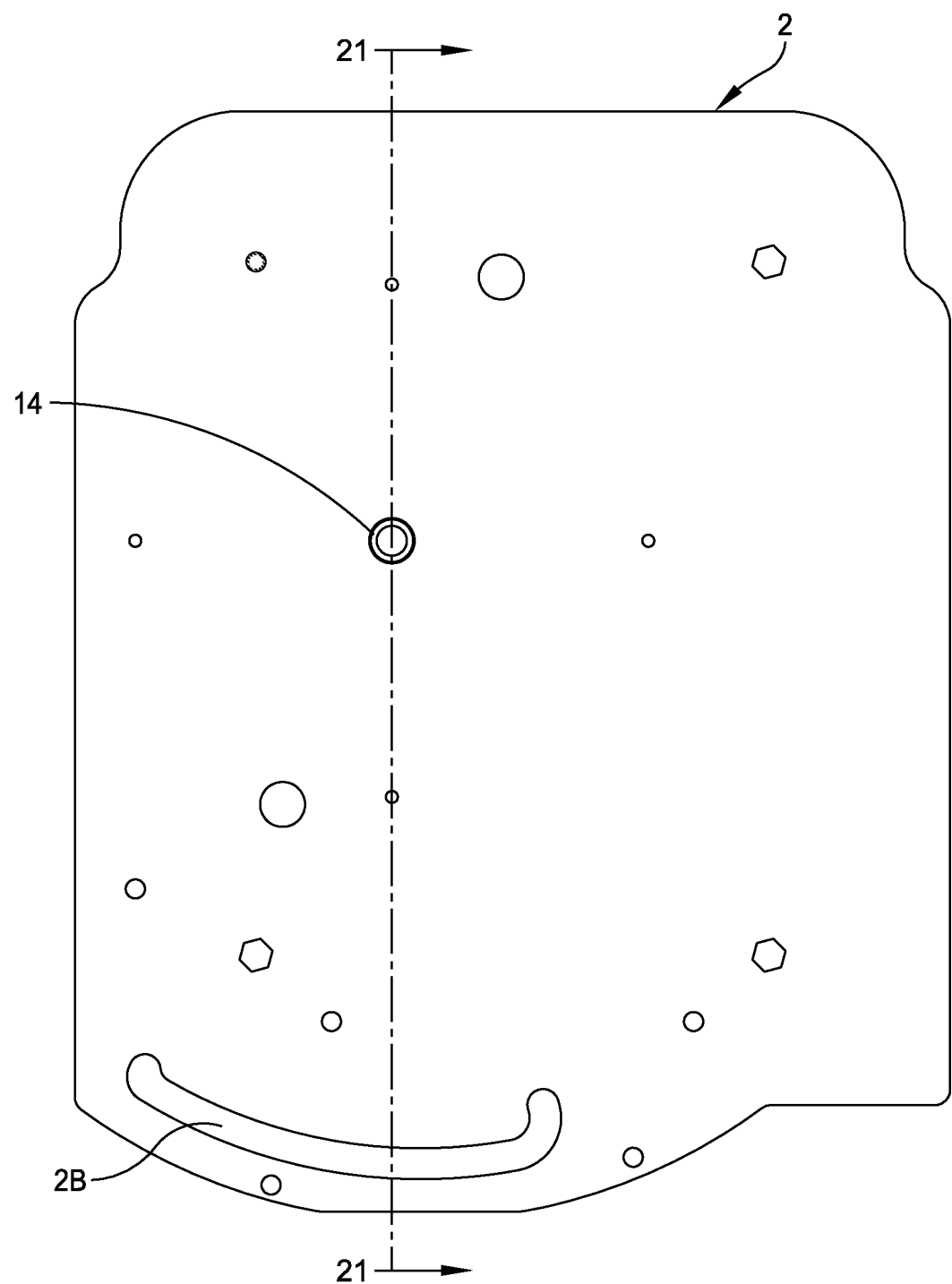
FIG. 20 is a plan view of the bottom assembly.
Figures 21, 22:
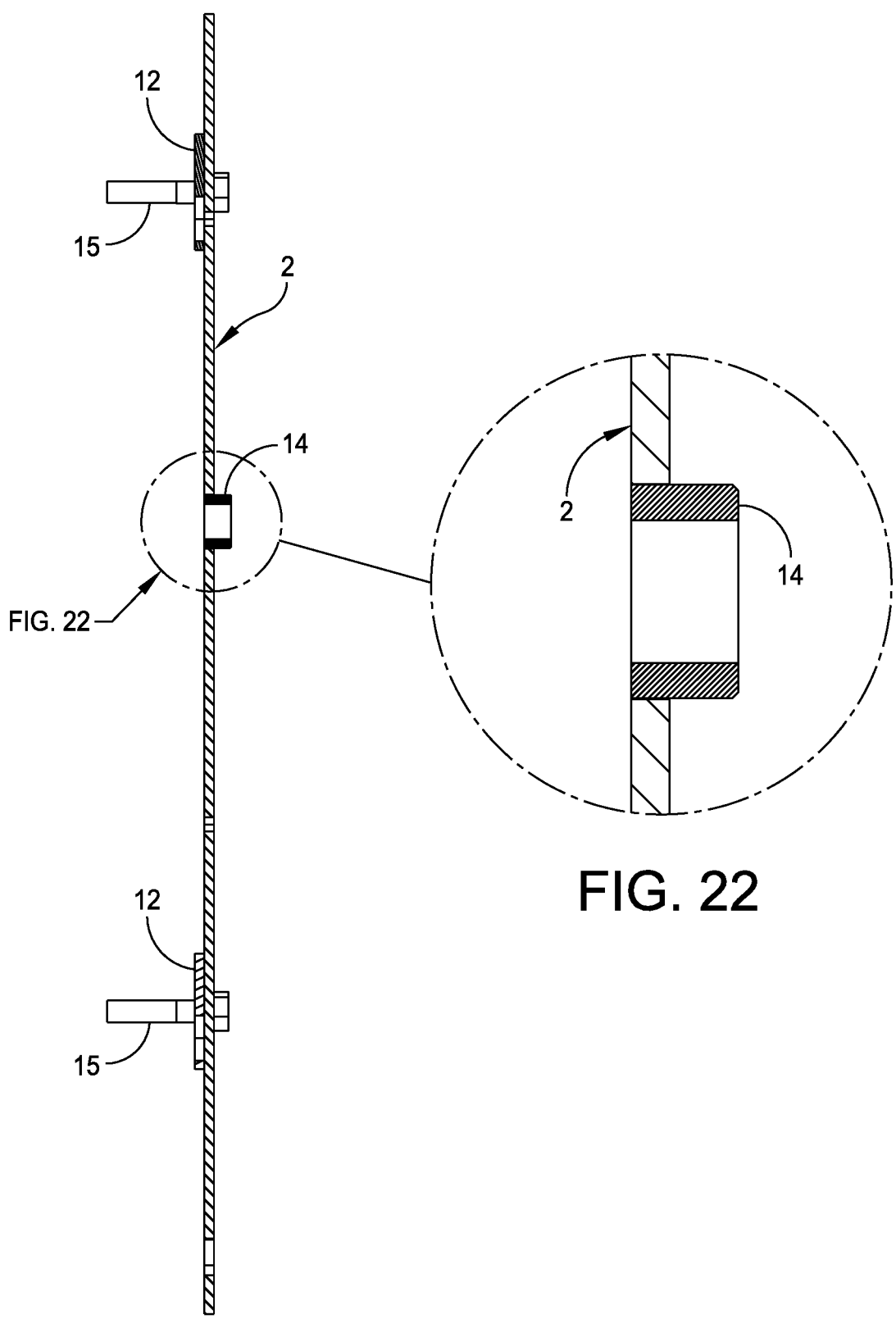
FIG. 21 is a cross-sectional view of the bottom assembly.
FIG. 22 is an enlarged fragmentary view from FIG. 22 showing the press fit bushing.

Reference is now made to the drawings for an illustration of one embodiment of the present invention. In this regard, FIG. 1 illustrates the seat disposed in a forward position while FIG. 2 illustrates the seat having been swivelled to a more outward or sideway position. In this regard, reference may also be made to FIGS. 31 and 32 for an illustration respectively of the forward position and the swivelled outward or sideway position. The seat construction as illustrated in, for example, FIG. 1 may be incorporated in any type of a vehicle and the concepts may be incorporated either on the driver side of the vehicle or the passenger side of the vehicle. The concepts may also be applied even to rearwardly supported seat constructions.

Figure 1A:
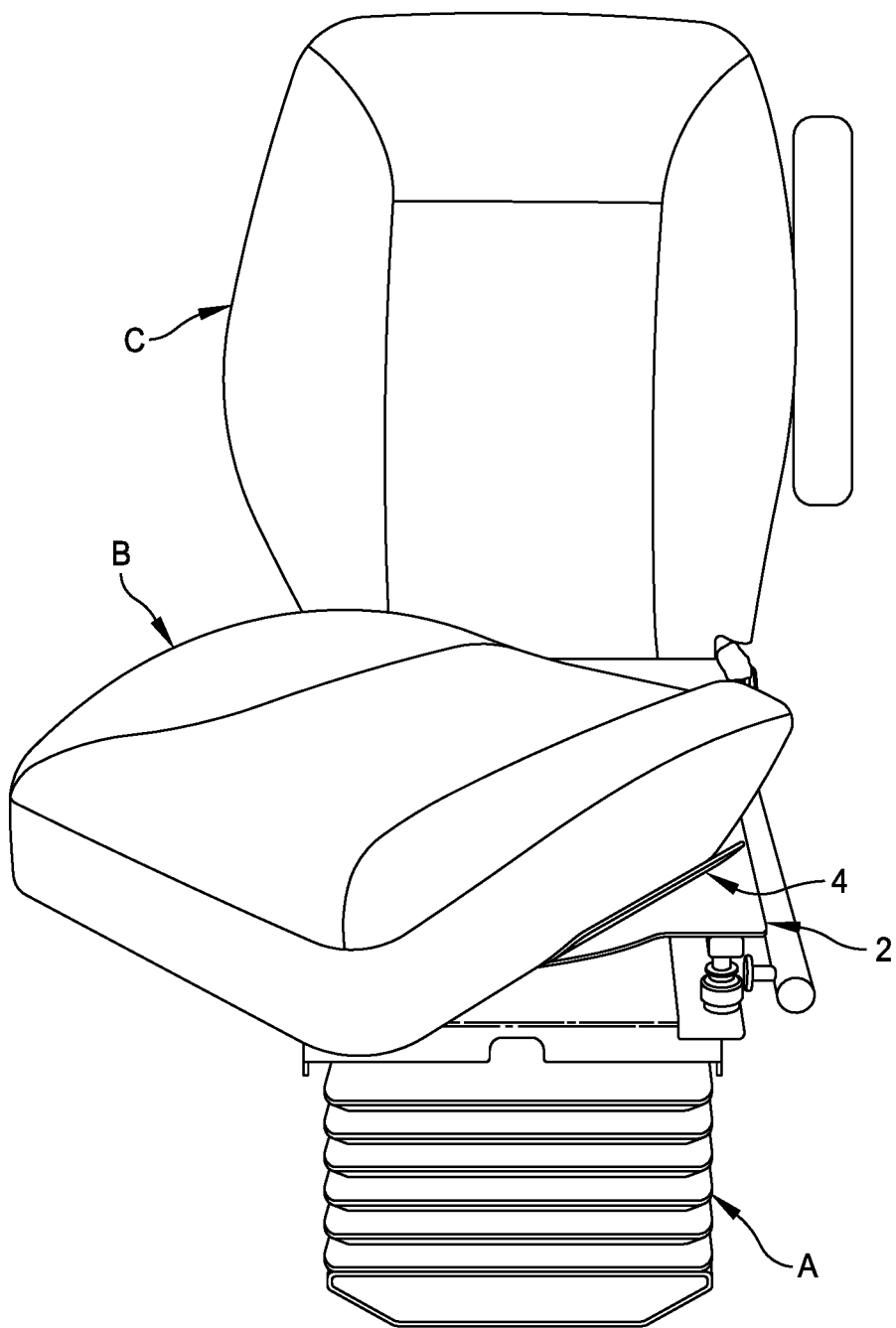
FIG. 1A is a perspective view showing the seat base or cushion in a swivel position relative to a fixed upright seat back support.

Reference is now made to FIG. 1A which is a perspective view showing the seat base or cushion in a swivel position relative to a fixed upright seat back support. The upright back C remains stationary, although, it could be provided with a separate adjustment which would usually be an incline adjustment. For the most part, and in accordance with describing the present invention, the upright back C is considered as stationary and does not swivel with the base cushion B.

Figure 28:
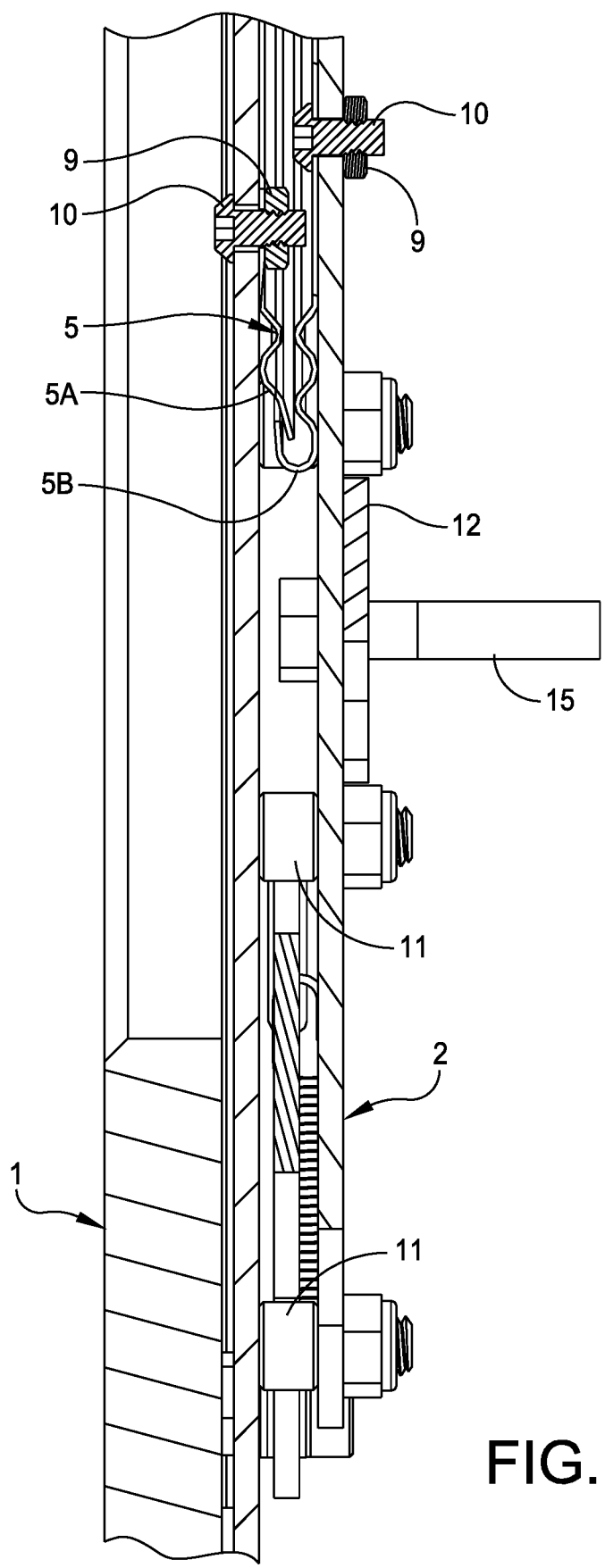
FIG. 28 is an enlarged fragmentary view of a portion outlined in FIG. 25.
Figure 29:
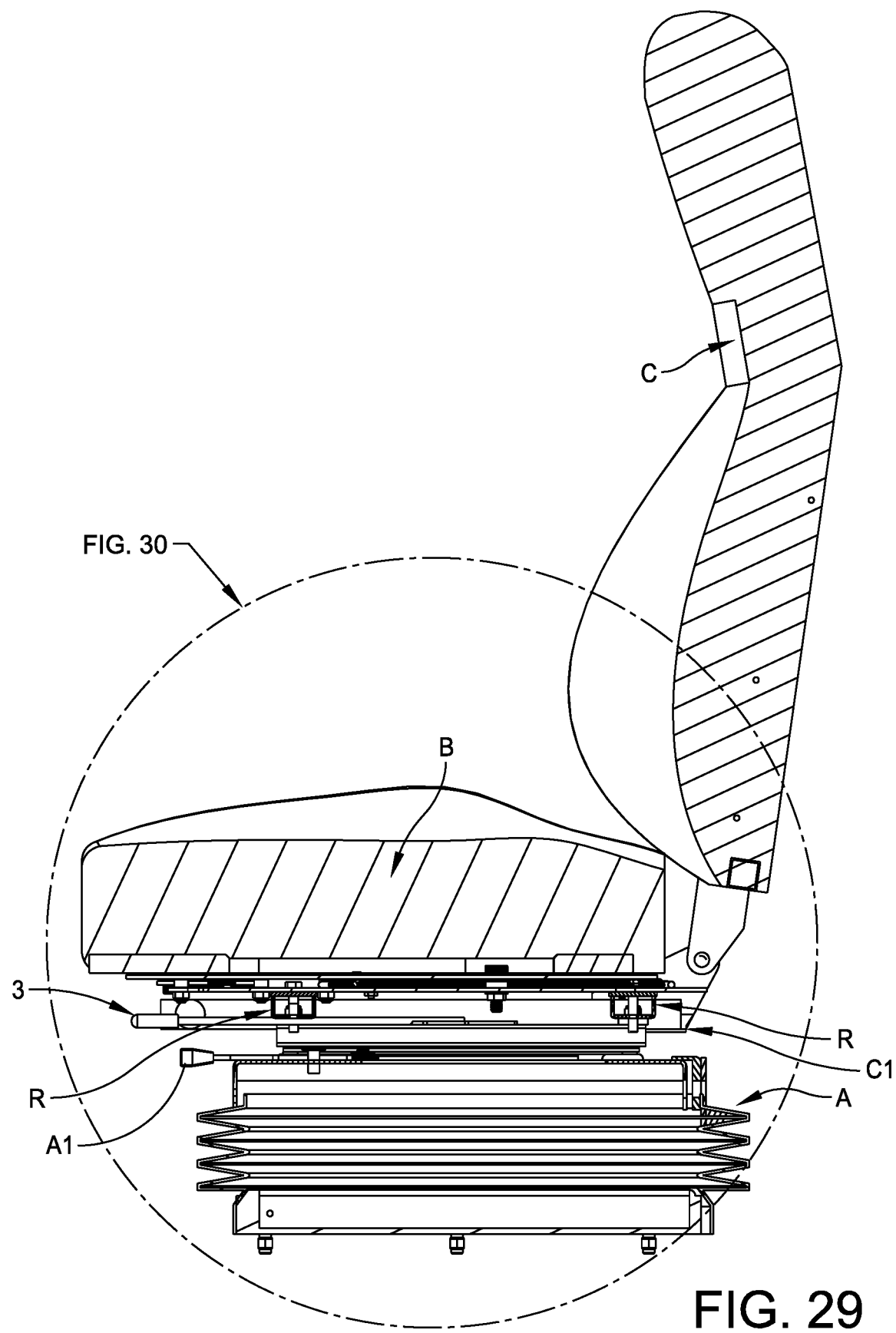
FIG. 29 is a side cross-sectional view showing the various components including those shown in the exploded view of FIG. 23.
Figure 30:
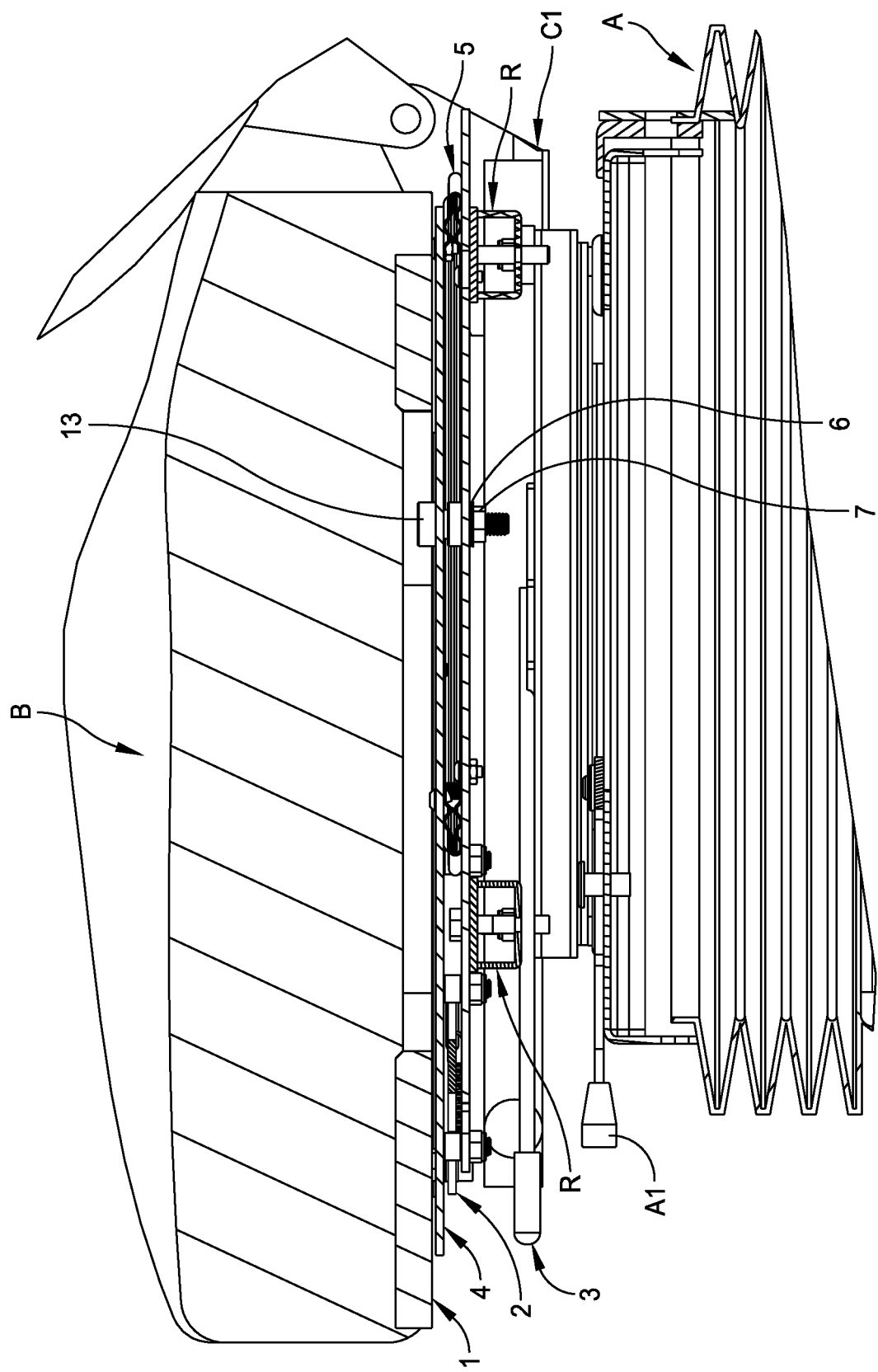
FIG. 30 is an enlarged fragmentary view of the circle area shown in FIG. 29.

Reference is made first to FIGS. 3-22 for an illustration of the various components that comprise the seat construction. These components are also illustrated in the exploded view of FIG. 23 and are furthermore illustrated in more detail in fragmentary cross-sectional views in FIGS. 26-28. FIGS. 29 and 30 also provide further illustrate the swivel, pivoting or rotational construction of the present invention.

For example, FIG. 29 illustrates one form of a seat construction that includes a base cushion B and an upright back C. FIG. 30 also illustrates a pair of seat rails R that support the seat construction that is supported by the swivel mechanism of the present invention. Below the seat construction illustrated in FIG. 29, there is provided a base assembly A that may assume many different forms and that may include a mechanism A1 capable of adjusting the overall construction up and down in a vertical manner. The particular construction of the base assembly A in FIG. 29 includes a form of an expandable/compressible accordion structure. However, other constructions at the base assembly are also anticipated as being useable with the swivel construction of the present invention.

It has been mentioned that the upright back C may be pivoted, in this regard reference may be made to FIGS. 29 and 30 that show a pivot location at the bottom of the upright back structure. However, other than a potential pivoting action, the base of the back C connects at C1 to the base assembly A. In FIGS. 29 and 30 refer to the reference number C1 illustrating the fixed connection of the upright back C with the base assembly A.

Figure 23:
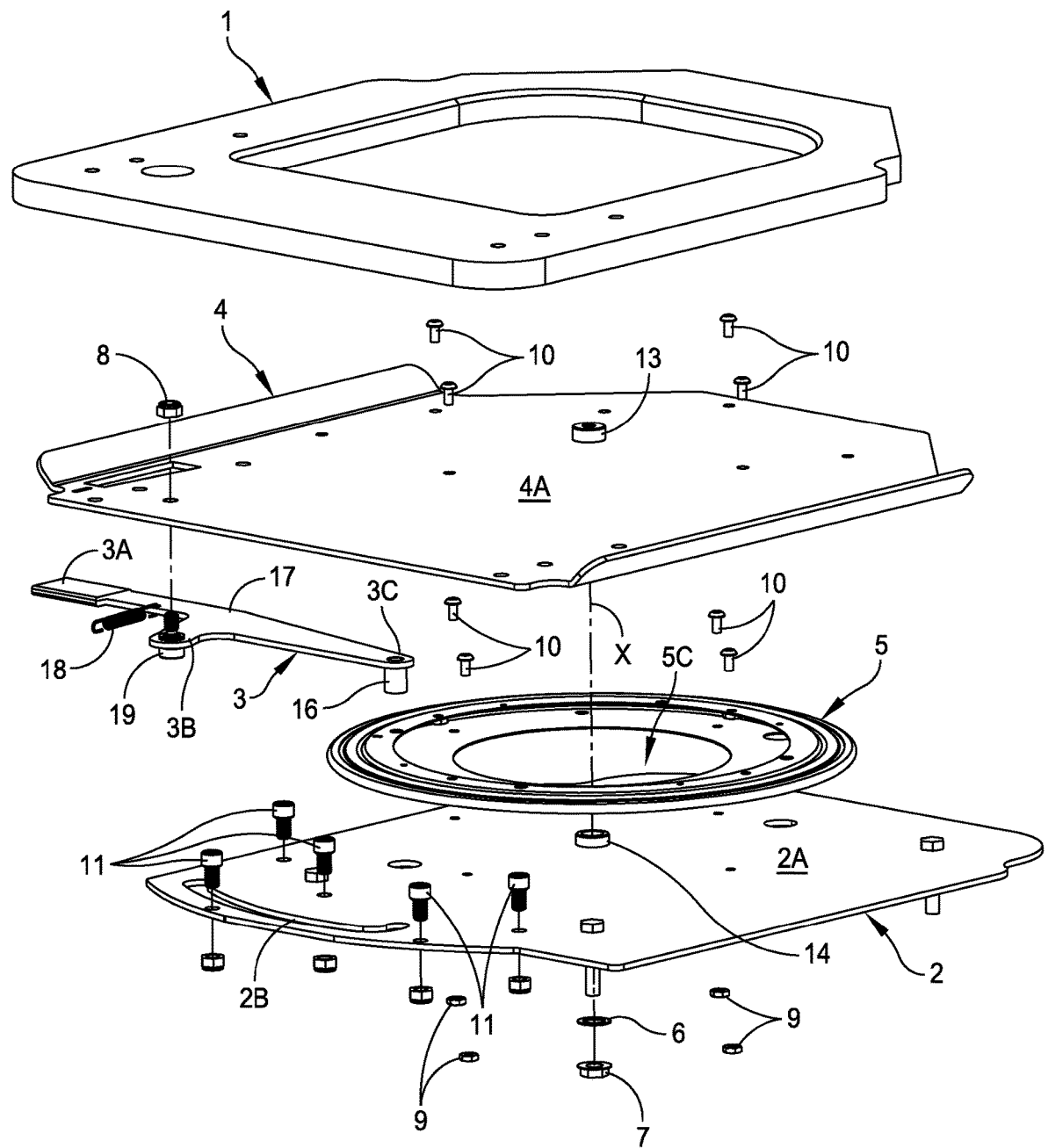
FIG. 23 is an exploded perspective view showing the various components comprising the seat support construction including the seat board, top assembly, turntable, bottom assembly and lever assembly.
Figure 24:
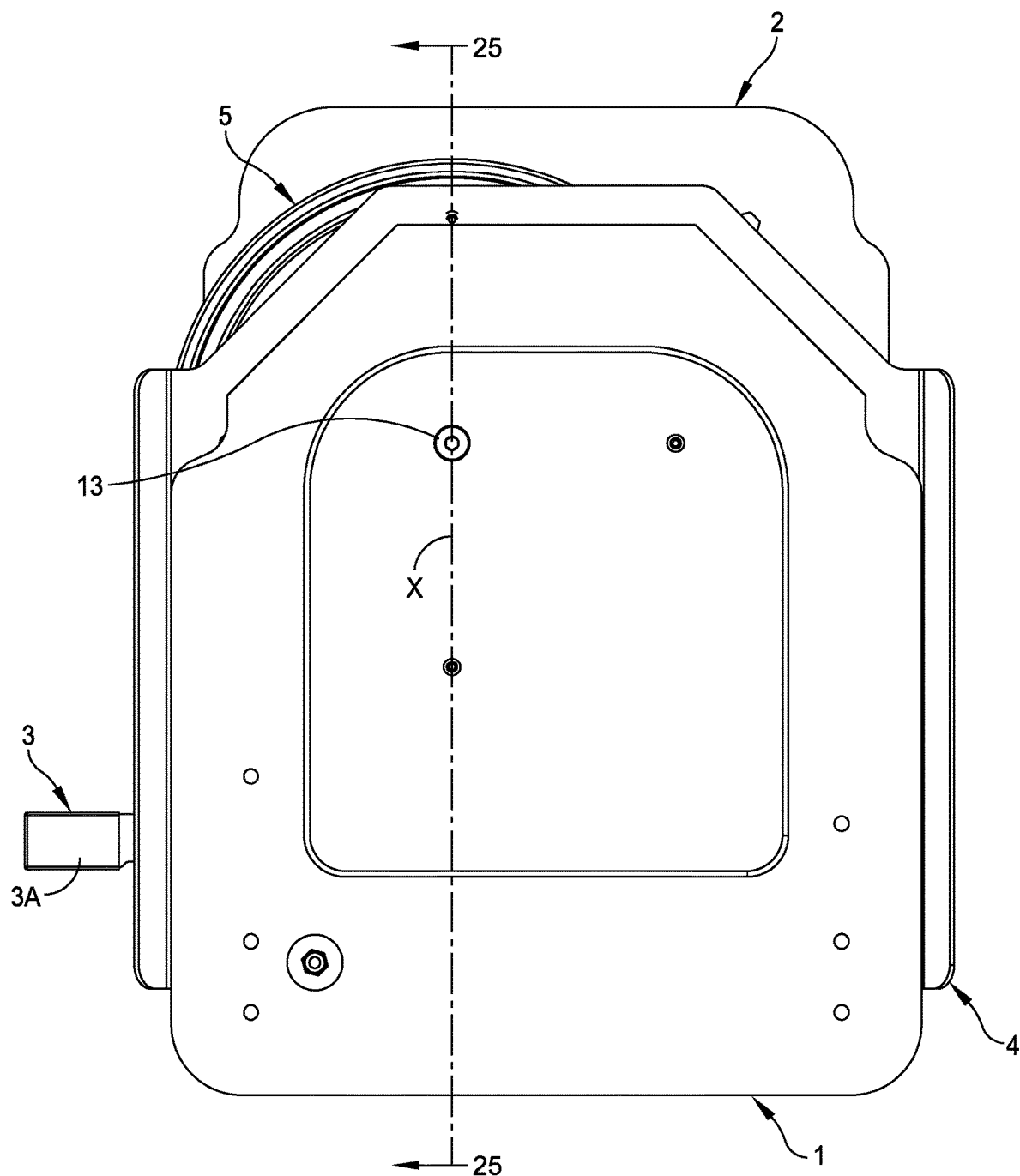
FIG. 24 is a plan view of the swivel construction.
Figure 25:
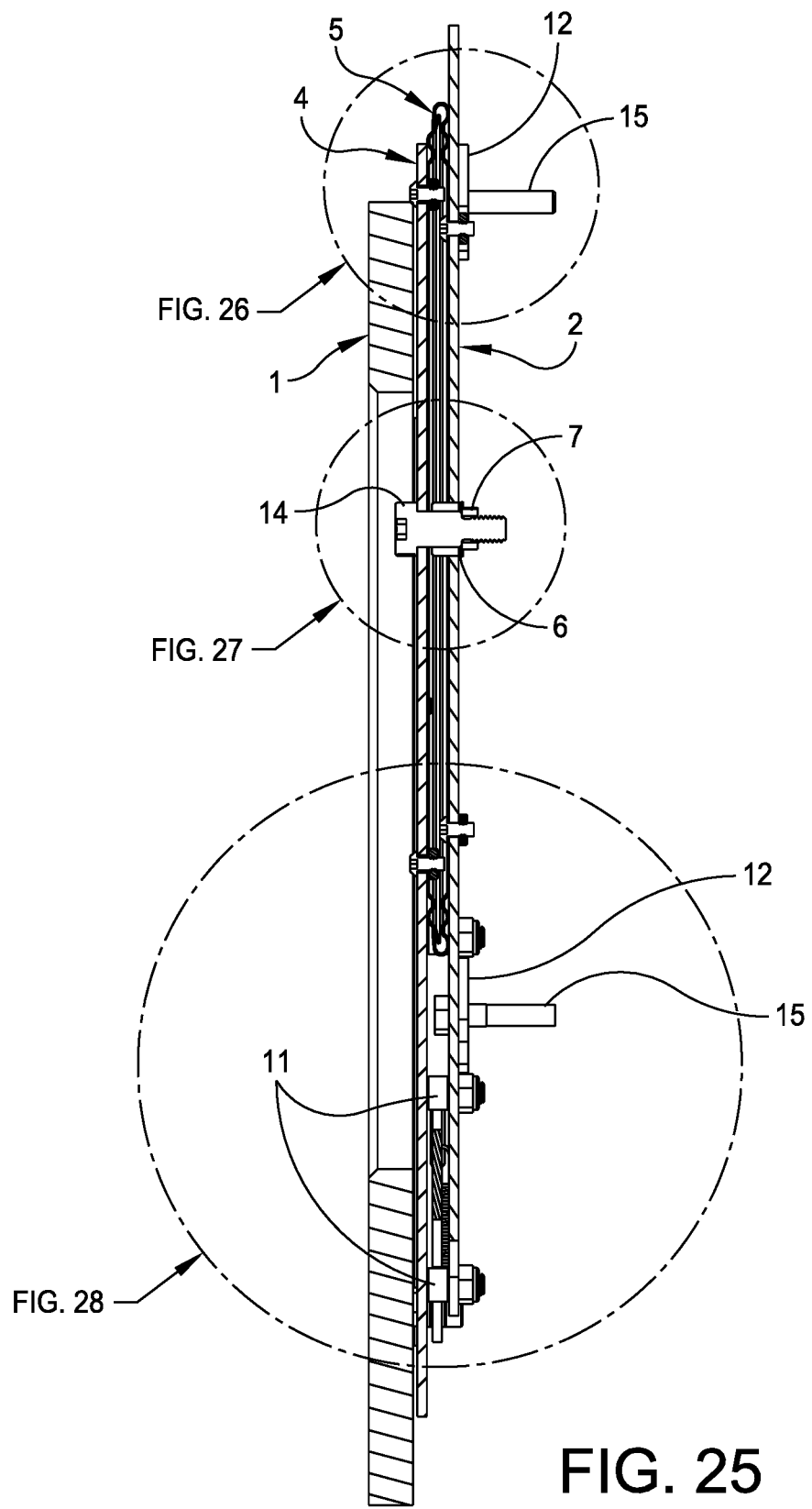
FIG. 25 is a cross-sectional view taken along line 25-25 of FIG. 24.

The vehicle seat apparatus of the present invention is comprised of a bottom assembly 2 that is for attachment to the floor of the vehicle by way of and over the base assembly A. This bottom assembly 2 is comprised primarily of the plate 2A. Refer also to the underside view of FIG. 2 that illustrates the pair of spacers 12 and threaded rods 15 that may be used for the support of the plate 2A from and over the base assembly A. The plate 2A also includes a slot 2B. In this regard refer also to the views depicted in FIGS. 3 and 4 that illustrate the slot 2B in the plate 2A. Refer also to the exploded view of FIG. 23 that shows the bottom assembly plate 2A and the slot 2B. The lever assembly 3 is also illustrated in FIG. 23 and is adapted to control the swivel motion between the plate 2A and the top assembly 4. Note the use in FIG. 23 of a spring 18 that urges the seat arrangement to either a forward or sideways position.

Figure 27:
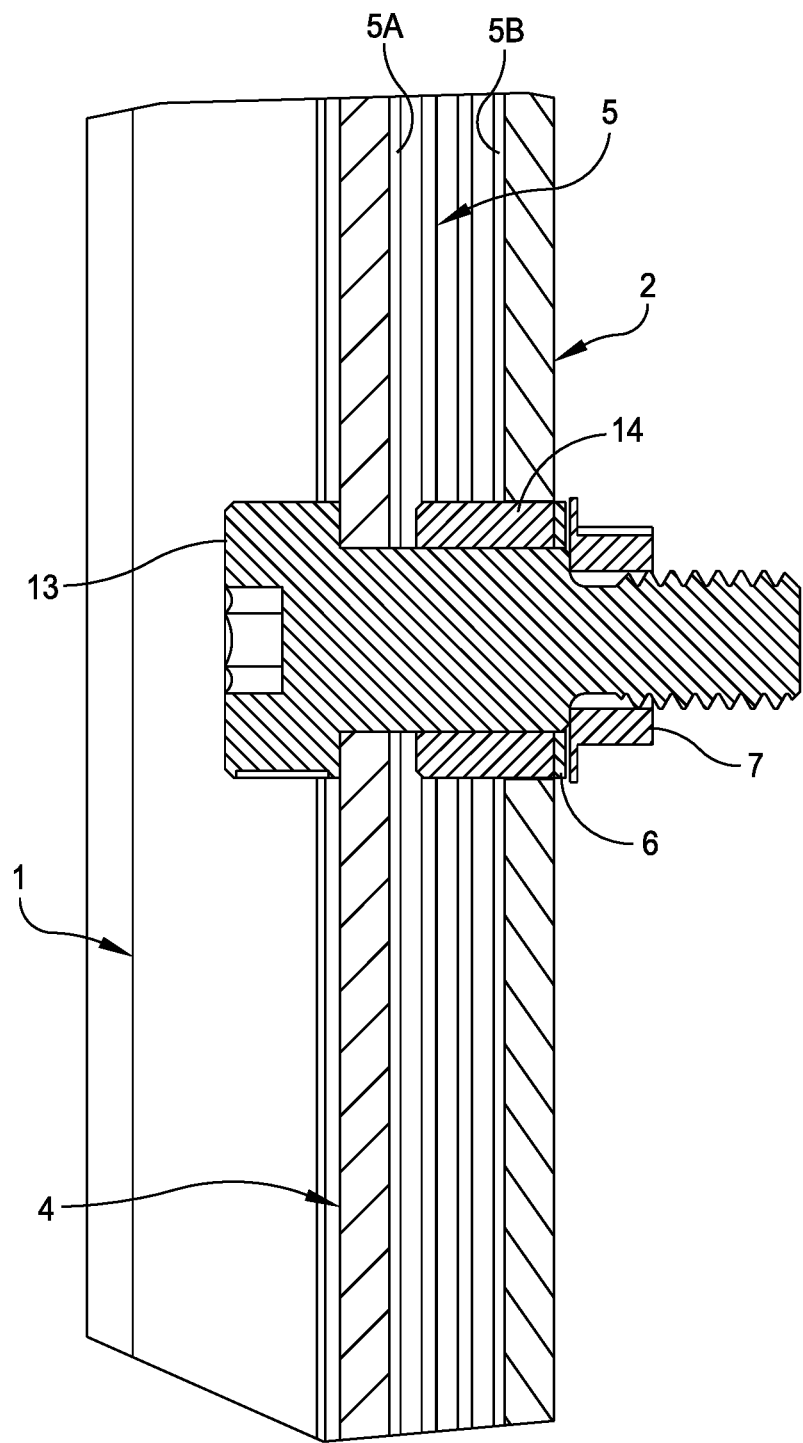
FIG. 27 is an enlarged fragmentary view of another portion of the cross-sectional view of FIG. 25.

The top assembly 4 is also illustrated in FIGS. 4-9 as including a top assembly plate 4A and a bolt 13 which is supported by the plate 4A and which provides the primary swivel axis. In this regard, refer also to the fragmentary cross-sectional view of FIG. 27 that shows the bolt 13 and associated nut 7. FIG. 27 also shows the use of a shim 6. In FIG. 27 there is provided the press bit bushing 14 that is essentially supported by the bottom assembly 2. This arrangement provides for a pivoting action wherein the bolt 13 is not located at the very center of the seat structure but is offset to the side. This is clearly depicted in, for example, FIGS. 31 and 32 wherein the bolt 13 is disposed closer to the left side than the right side as viewed in FIGS. 31 and 32. Refer also to FIG. 6 which shows this off-center or off-set arrangement wherein the bolt axis X is shown as separate and spaced from the center axis U. This offset arrangement is important in providing the proper swiveling motion so that the seat can be swivelled, such as to the position shown in FIG. 32 providing ready access to the seat by a user (either a passenger or driver).

As also illustrated in FIG. 23, as well as in FIGS. 26-32, there is provided a turntable 5. The turntable 5, per the exploded view of FIG. 23, is essentially mounted between bottom assembly 2 and the top assembly 4. This turntable 5 allows for a rotational motion of the top assembly 4 relative to the bottom assembly 2. This swiveling, pivoting or rotational action is primarily initiated by means of the lever assembly 13. The lever assembly 3 includes an outer handle 3A that is movable to pivot the lever mechanism and, in turn, seat construction relative to the base.

Figure 32:
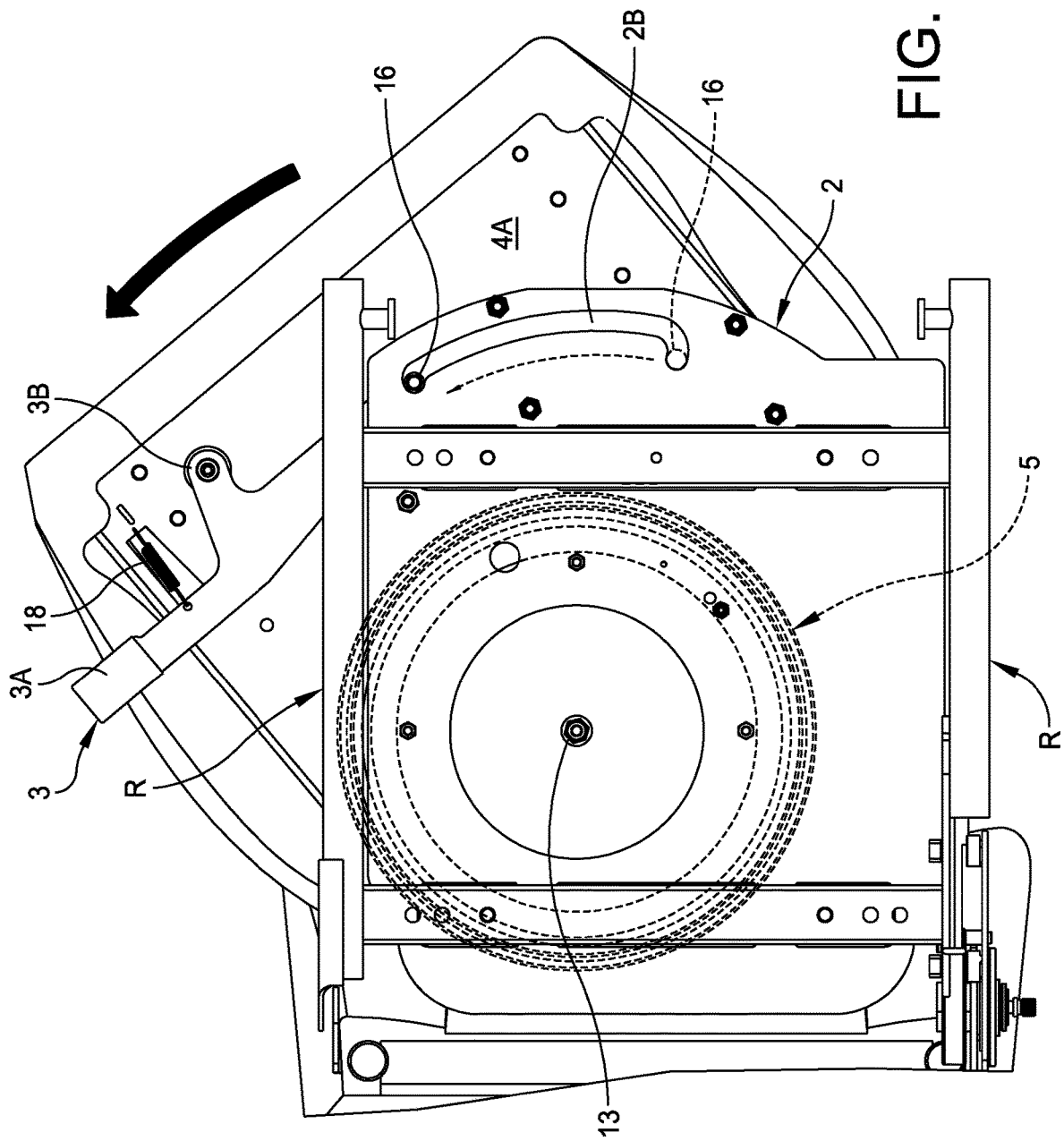
FIG. 32 is an underside view with the seat structure in a swivel out position.

The lever assembly or mechanism is constructed primarily of an elongated lever 17. Again refer to the exploded view of FIG. 23 that illustrates the lever assembly construction. Refer also to FIGS. 10 and 11 that shows the elongated lever 17. This lever 17 has an intermediate section 3B that is secured to the top assembly 4 and furthermore has an end section 3C that engages with the bottom assembly 2. In this regard, the end section 3C of the lever mechanism includes a cam member or sleeve 16 that engages in the slot 2B that is defined in the bottom plate 2A of the bottom assembly 2. In this regard, refer to FIG. 31 that shows the slot 2B and the cam member or sleeve 16 at one end of the slot 2B. This depicts a forward position. By the slot being dead-ended, in that position the seat structure is disposed and maintained in a forward facing position. Refer also to the position in which the seat is swivelled outwardly or sideways, as depicted in FIG. 32 wherein it is noted that the cam member or sleeve 16 is disposed at the opposite end of the slot 2B. This end of the slot is also dead-ended. Detent may be provided for maintaining the cam member in either of the opposed positions of FIG. 31 or 32. The slot 2B is clearly shown in the plan view of FIG. 3 and is a through slot that has a somewhat arcuate shape. The cam member engages within this slot and may be in the form of a plastic sleeve 16 illustrated in the drawings in FIGS. 14 and 15.

The vehicle seat construction of the present invention includes a seat board 1 that is secured between the top assembly and the vehicle seat structure. The turntable 5 is basically comprised of an inner turntable disk 5A and an outer turntable disk 5B, one of which is attached to the top assembly and the other of which is attached to the bottom assembly. As is also depicted in FIG. 23, the turntable 5 has an open middle portion 5C. The structure further includes a pivot member disposed within the open middle portion 5C of the turntable and that functions as a pivot axis of the top assembly relative to the bottom assembly. Again, this is depicted in the exploded view of FIG. 23 by the bolt 13 and the related axis X.

Figure 26:
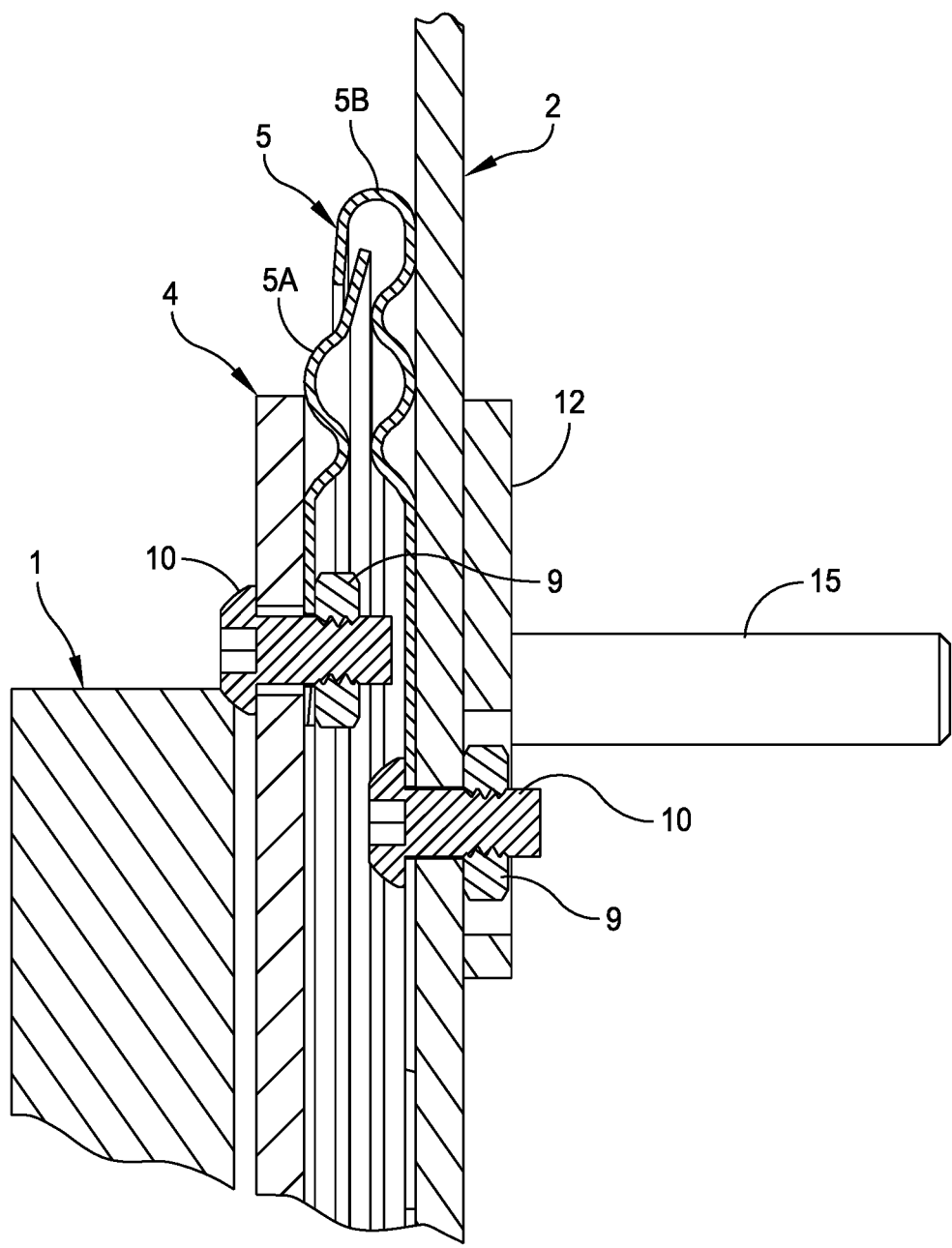
FIG. 26 is an enlarged fragmentary view of a portion of FIG. 25.

For further details of the turntable construction, reference is now made to the enlarged fragmentary view of FIG. 26 that shows an inner turntable disk 5A and an outer turntable disk 5B. A first set of fasteners 10A (and associated nuts 9) are provided for securing the inner turntable disk to the top assembly 4. There is also provided and illustrated in the cross-sectional view of FIG. 26 a second set of fasteners 10B (and associated nuts 9) for securing the outer turntable disk 5B to the bottom assembly 2. Again, the pivot member 13 is disposed offset from a center location of the bottom assembly as depicted in FIG. 6. This pivot member includes a pivot bolt 13 that is disposed at the top assembly and that engages with a nut 7 at the bottom assembly 2.

The turntable 5 comprised of separate inner and outer turntable disks is constructed so that these interlock with each other, such as shown in the cross-sectional view of FIG. 26 but permit relative rotation between the disks. Where each of the turntable disks 5A, 5B are respectively secured to the assemblies 4, 2, the swiveling action allows a motion as illustrated by the respective views of FIGS. 31 and 32.

The following is a parts list of the main components shown in the drawings:
1 Seat Board
2 Bottom Assembly
3 Lever Assembly
4 Top Assembly
5 Turntable
6 Steel Shim
7 Nut
8 Nylon Nut
9 Hex Nut
10 Screw
11 Nylon Bolt
12 Spacer
13 Bolt
14 Press Fit Bushing
15 Threaded Rod
16 Plastic Sleeve
17 Lever
18 Spring
19 Shoulder Bolt
20 Buzzer

Having now described a limited number of embodiments of the present invention, it should now be apparent to those skilled in the art that numerous other embodiments and modifications thereof are contemplated as falling within the scope of the present invention, as defined by the appended claims. For example, in the illustrated embodiment the lever mechanism is pivoted from the top assembly and engages a slot in the bottom assembly. In an alternate embodiment the lever mechanism may be supported from the bottom assembly and the slot provided in the top assembly. In either case the lever mechanism provides for the swiveling function of the seat structure relative to a base piece supported over the floor of the vehicle.

What is claimed is:

1. A vehicle seat apparatus comprising:
a bottom assembly that is attached to a floor of the vehicle;
a top assembly that is for the support of a seat structure;
a turntable that is mounted to the bottom assembly and the top assembly and rotatable to allow rotational motion of the top assembly relative to the bottom assembly, wherein the turntable includes an inner turntable disc and an outer turntable disc, the inner turntable disc having a first inner opening defined by an inner disc inner edge concentric about a centroid of the inner turntable disc, and the outer turntable disc having a second inner opening defined by an outer disc inner edge concentric about a centroid of the outer turntable disc, wherein the inner turntable disc and the outer turntable disc are rotatably and coaxially secured together for relative rotation about their centroids, and wherein a first set of screws secures one of the turntable discs to the top assembly and a second set of screws secures the other of the turntable discs to the bottom assembly, each of said first and second sets of screws extending through a respective one of the turntable discs and a respective one of the assemblies;
a lever mechanism secured to the top assembly and pivotal relative to the bottom assembly in order to pivot the top assembly and the seat structure from a more forward position to a more sideways position so as to provide enhanced access to the seat structure;
a pivot member that functions as a pivot axis of the top assembly and the one of the turntable discs relative to the bottom assembly and the other of the turntable discs; and
a cylindrical bushing fixed to one of the assemblies and positioned within the first inner opening on the centroid of the inner turntable disc, spaced from the inner turntable disc, and between the pivot member and the inner turntable disc, wherein the bushing is positioned within the second inner opening on the centroid of the outer turntable disc, spaced from the outer turntable disc, and between the pivot member and the outer turntable disc to allow for rotational motion of the inner turntable disc relative to the outer turntable disc, wherein the cylindrical bushing is in direct contact with the pivot member within the first inner opening and the second inner opening.

2. The vehicle seat apparatus of claim 1 including a seat board that is secured between the top assembly and the seat, structure, and wherein the seat structure includes a base cushion and an upright back, and the top assembly is for support of the base cushion providing a swivel action of the base cushion while the upright back is maintained in a non-swivel condition.

3. The vehicle seat apparatus of claim 2 wherein the seat structure further includes a seat base.

4. The vehicle seat apparatus of claim 1 wherein the lever mechanism includes an outer handle that is moveable to pivot the lever mechanism, an intermediate section that is secured to the top assembly and an end section that engages with the bottom assembly.

5. The vehicle seat apparatus of claim 4 wherein the end section of the lever mechanism includes a cam member that engages in a slot that is defined in a bottom plate of the bottom assembly.

6. The vehicle seat apparatus of claim 5 wherein the slot that is defined in the bottom plate of the bottom assembly is arcuate in shape and the cam member engages into the arcuate slot.

7. The vehicle seat apparatus of claim 6 wherein the inner turntable disc is attached to the top assembly and the outer turntable disc is attached to the bottom assembly.

8. The vehicle seat apparatus of claim 7 wherein the pivot member is disposed offset from a central location of the bottom assembly.

9. The vehicle seat apparatus of claim 8 wherein the pivot member includes a pivot bolt that is disposed at the top assembly and engages with a nut at the bottom assembly.

10. The vehicle seat apparatus of claim 1 wherein the pivot member is disposed offset from a central location of the bottom assembly.

11. The vehicle seat apparatus of claim 10 wherein the pivot member includes a pivot bolt that is disposed at the top assembly and engages with a nut at the bottom assembly.

12. The vehicle seat system of claim 2 wherein the lever mechanism includes an outer handle that is moveable to pivot the lever mechanism, an intermediate section that is secured to the top assembly and an end section that engages with bottom assembly, wherein the end section of the lever mechanism includes a cam member that engages in a slot that is defined in a bottom plate of the bottom assembly, and wherein the lever mechanism can be supported from either the top assembly or the bottom assembly.

13. The vehicle seat system of claim 2 wherein the pivot member is disposed offset from a central location of the bottom assembly, and wherein the pivot member includes a pivot bolt that is disposed at the top assembly and engages with a nut at the bottom assembly.

\* \* \* \* \*